(12) United States Patent
Dow et al.

(10) Patent No.: US 9,140,548 B2
(45) Date of Patent: Sep. 22, 2015

(54) METHOD AND APPARATUS FOR DIRECT DETECTION, LOCATION, ANALYSIS, IDENTIFICATION, AND REPORTING OF VEGETATION CLEARANCE VIOLATIONS

(71) Applicant: Aerotec, LLC, Bessemer, AL (US)

(72) Inventors: James W. Dow, Pelham, AL (US); Michael D. Rhodes, Gardendale, AL (US); William A. Openshaw, Bessemer, AL (US); W. Scott Dow, Picayune, MS (US); Alan R. Page, Moundville, AL (US)

(73) Assignee: Aerotec, LLC, Bessemerr, AL (US)

( * ) Notice: Subject to any disclaimer, the term of this patent is extended or adjusted under 35 U.S.C. 154(b) by 0 days.

(21) Appl. No.: 14/243,211

(22) Filed: Apr. 2, 2014

(65) Prior Publication Data

US 2014/0211005 A1 Jul. 31, 2014

Related U.S. Application Data

(63) Continuation of application No. 13/764,136, filed on Feb. 11, 2013, now Pat. No. 8,724,900, which is a continuation of application No. 12/844,500, filed on Jul. 27, 2010, now Pat. No. 8,374,431.

(51) Int. Cl.
| | |
|---|---|
| *G06K 9/36* | (2006.01) |
| *G01C 3/08* | (2006.01) |
| *G01B 11/24* | (2006.01) |
| *G01B 11/28* | (2006.01) |
| *G06K 9/00* | (2006.01) |
| *H04N 7/18* | (2006.01) |

(52) U.S. Cl.
CPC ........ *G01C 3/08* (2013.01); *G01B 11/24* (2013.01); *G01B 11/28* (2013.01); *G06K 9/0063* (2013.01); *G06K 9/00657* (2013.01); *H04N 7/18* (2013.01)

(58) Field of Classification Search
USPC ......... 382/291, 214, 113, 189, 173, 154, 128, 382/106; 356/12, 4.01, 35.5; 324/244; 73/656, 657, 582, 579, 655; 313/325; 372/87; 348/144; 345/419; 435/284.1, 435/296.5, 286.6; 250/559.07; 396/316, 396/439; 701/120, 532; 702/5; 600/409
See application file for complete search history.

(56) References Cited

U.S. PATENT DOCUMENTS

| | | | | |
|---|---|---|---|---|
| 4,302,088 | A | * | 11/1981 | Vezie ............................. 396/316 |
| 5,444,618 | A | * | 8/1995 | Seki et al. ......................... 702/5 |

(Continued)

OTHER PUBLICATIONS

McLaughlin R. et al., "Recognising Aircraft: Automatic Extraction of Structure by layers of Quadratic Neural Nets," in Proceedings IEEE international Conference on Neural Networks, Orlando, Florida, vol. 7, pp. 4288-4293, Jun./Jul. 1994.

(Continued)

*Primary Examiner* — Anh Do
(74) *Attorney, Agent, or Firm* — Nixon Peabody LLP

(57) ABSTRACT

A method and system for processing digital image data taken from a three-dimensional topographic area including terrain and a right of way including a first and a second object to establish a clearance surface to define clearance violations within a boundary area. Waypoints are located to define a centerline and the boundary area to be analyzed. Vegetation coordinate points in the scene are determined from the digital image data. Ground coordinate points are determined from the digital image data. A clearance surface segment is constructed within the boundary area between the first and second object. The clearance surface is determined from the location of the first and second object and clearance criteria. The clearance surface is used to define a violation region.

18 Claims, 12 Drawing Sheets

(56) References Cited

U.S. PATENT DOCUMENTS

| | | | |
|---|---|---|---|
| 6,046,046 A | 4/2000 | Hassanein | 435/284.1 |
| 6,473,518 B1* | 10/2002 | Machida et al. | 382/128 |
| 6,664,529 B2 | 12/2003 | Pack et al. | 250/208.1 |
| 7,046,841 B1 | 5/2006 | Dow et al. | 382/154 |
| 8,009,871 B2 | 8/2011 | Rafii et al. | 382/106 |
| 8,234,058 B1 | 7/2012 | Barber et al. | 701/120 |
| 2002/0060784 A1 | 5/2002 | Pack et al. | 250/208.1 |
| 2004/0041805 A1 | 3/2004 | Hayano et al. | 345/420 |
| 2004/0058643 A1 | 3/2004 | Martin et al. | 455/422.1 |

OTHER PUBLICATIONS

McLaughlin R. et al., "The Hough Transform Versus the Upwrite," IEEE Transactions on Pattern Analysis and Machine Intelligence, vol. 20, No. 4, pp. 396-400, Apr. 1998.

McLaughlin R., et al., "The Hough Transform and the Upwrite: a comparison;" in Proceedings IEEE International Conference on Neural Networks, Perth, Western Australia, vol. 1, pp. 146-151, Nov./Dec. 1995.

McLaughlin R., et al., Recognising of Infra Red Images of Aircraft Rotated in Three Dimensions, in Proceedings IEEE ANZIIS, Perth, Western Australia, pp. 82-87, 1993.

McLaughlin, Robert, "Intelligent algorithms for finding curves and surfaces in real world data," University of Western Australia, pp. 1-176; 2000.

Nelson, Randal C., "Finding line segments by Stick Growing." IEEE Transactions on Pattern Analysis and Machine Intelligence, vol. 6, No. 5, pp. 519-523, May 1994.

Yuh-Tay Liow, "A Two-Step Approach to Detect Contours Formed by Sharp Intensity Changes," in Proceedings of the IECON-93, 19th Annual Conference of IEEE Industrial Electronics, New York, NY, U.S.A., vol. 3, pp. 1616-1619, Nov. 1993.

* cited by examiner

METHOD AND APPARATUS FOR DIRECT DETECTION, LOCATION, ANALYSIS, IDENTIFICATION, AND REPORTING OF VEGETATION CLEARANCE VIOLATIONS

The present disclosure relates generally to the field of detecting, locating, analyzing, identifying, and reporting vegetation objects and/or other objects (both natural and manmade) in corridors/rights-of-way to determine whether or not such objects violate specific clearance criteria (clearance distance/spacing specifications) with respect to such objects' proximity (spatial relationship) to critical operating components such as electric power conductors.

BACKGROUND

Aerial photography, light detection and ranging ("LIDAR"), synthetic aperture radar, and other types of remote sensing technologies are capable of capturing digital imagery of real-world scenes for the purpose of extracting three-dimensional point coordinate (spatial geometry) data. These technologies are widely used in industry as vital tools to collect the data necessary for map-making, engineering modeling, land management, vegetation assessment/management, and/or asset management. These tools are valuable because they can capture spatial (point coordinate) data in a digital form that ultimately allows a wide variety of computer-based tools to be applied to the tasks of map-making, 3D modeling for engineering analysis, vegetation assessment/management, and/or asset management. Today, however, considerable time and effort (manual human intervention) is required to "interpret" the resulting imagery and extract information suitable (e.g., in a more meaningful object-oriented form) for the end-application use of the desired (necessary and sufficient) information. Thus, systems and methods are continuously sought to improve the accuracy, effectiveness, and efficiency of "measurements" which can be directly compared or contrasted against specific criteria to determine the risks associated with any failures to meet/satisfy such specific measurement criteria.

Three-dimensional coordinate point data (3D imagery of a real-world scene) is practically useless unless the location of individual points in 3D space can be compared to the locations of recognizable objects within the real-world scene (e.g., the relative spatial relationships between the recognizable objects and the individual measured points can be compared to specific measurement criteria). The immediate need is to determine whether or not specific clearance distances are maintained between the recognizable objects and the individually measured points on the potential violating object.

There are many tools available to model and analyze the spatial relationships between two objects after they have been recognized and after their geometric and physical attributes have been determined. However, at the present time, there are only a few rudimentary approaches (usually based on simple direct point-to-point distance measurements/calculations) to determine the degree of interference (relative spatial clearance criteria violation) between two objects in 3D space.

The most widely accepted manual approach to dealing with vegetation clearance violations is to "clear-cut" the rights of way of all "significant" vegetation. This is also the most expensive and most conservative approach, but it generally does away with the vegetation risks within the boundaries of the rights of way. Outside the rights of way, taller vegetation (trees) still pose a significant risk, and protracted negotiations (often involving protracted court cases) with land owners are required to gain the right to mitigate such risks. The issue of accuracy of the determination of the risk level is often the key point of the negotiations.

Another widely accepted manual approach to identifying vegetation clearance violations of specific right of way clearance criteria is to: a) have an arborist or forester attempt to visualize where an electrical conductor or other object of interest might physically be/exist under specific operating conditions; and then b) estimate and/or attempt to measure the distance from some vegetation point to an imagined point on a conductor or other object of interest where that particular conductor point might exist under a given operating condition such as conductor operating temperature. Again, the issue of accuracy of the determination of the risk level is often the key point.

One data intensive approach is to have photogrammetrists construct stereo-models from pairs of stereo photographs, either traditional film or scanned digital images, of the right of way having objects of interest. Then, the photogrammetrists use their visual interpretive skills to interpret the images and manually digitize (measure) the distance between selected points on the recognized objects of interest. The measured distance is compared to the required clearance criteria to identify violations. This is an interpretive approach subject to error.

Another data intensive approach is to have photogrammetrists and/or data analysts construct "point cloud" models from either stereo photography or 3D LIDAR/synthetic aperture radar derived points, visually interpret the point clouds, and digitize (measure) the distance between selected points on the recognized objects of interest. Then the measured distance is compared to the required clearance criteria to identify violations. Again, this is an interpretive approach subject to error.

Yet another data intensive approach is to have data analysts construct classified "point cloud" models from 3D LIDAR/synthetic aperture radar derived points. This is done by subdividing or classifying the total set of available points into smaller sets of points with each set being associated with a particular object or type of object and then comparing each point in one selected set of points with each point in each of the remaining sets of points to determine whether or not an interference (clearance violation) exists between any two points of the point sets being compared. The ability of the analyst to visualize the degree of interference (clearance violation) between any two interfering sets of points is difficult at best; while the requirement to communicate the location and degree of interference to others is tedious, laborious, and nearly impossible to resolve, particularly when the possibility of very large numbers of clearance violations readily exists.

Yet another data intensive approach is to have data analysts/engineers construct classified "point cloud" models from 3D LIDAR/synthetic radar derived points (e.g., subdivide or classify the total set of available points into smaller sets of points with each set being associated with a particular object or type of object), construct engineering models from the data, construct the conductor catenary curves for the appropriate conductor operating conditions, and compare the distance from each catenary curve to each vegetation point to the required clearance criteria in order to determine violations of the criteria using automated engineering analysis/design software packages. Although this approach produces accurate and useful results, it requires special 3D engineering model construction and analysis skills to accomplish the task.

Each of the preceding examples of existing available analytical approaches has at least one major shortcoming that has not been dealt with to date. That is, not one of the previously mentioned approaches provides the inspector in the field with a workable tool to accomplish his job after the initial analysis results have been consumed (e.g., the vegetation violations have been cut or trimmed), and/or the vegetation/trees have grown back to a state that the violations have reoccurred. Thus, the capability to audit or check the clearing/cutting work or check for new violations does not exist.

Each of the preceding examples of existing available analytical approaches is directed toward the task of discerning the existence of interferences (clearance violations) between two recognizable objects of interest within the real-world scene of multiple available objects. All of the above methods/ approaches have major shortcomings; and few, if any of the methods/approaches mentioned above, lend themselves to being implemented "in the field" or out in the physical real world where the physical objects actually exist. The data processing events and computing power/equipment requirements of the previously mentioned approaches prohibit such in the field execution of such methods/approaches. The data volumes are simply too large to handle easily in the field. Meanwhile, manual methods require gross estimates of changing physical conditions and accuracy is limited, so drastic solutions such as clear-cutting prevail.

Thus there is a real need for a method/system and apparatus that resolves the measurements/results accuracy and reporting issues as well as the data volume issues while providing a solution approach that can be applied equally as effectively in the office using more capable data processing techniques and in the field using small, light weight, portable equipment.

SUMMARY

According to one example, a method for processing digital image data taken from a three-dimensional topographic area including terrain and a right of way including a first and a second object to establish a clearance surface to define clearance violations within a boundary area. Waypoints are located to define a centerline and the boundary area to be analyzed. Vegetation coordinate points in the scene are determined from the digital image data. Ground coordinate points are determined from the digital image data. A clearance surface segment is constructed within the boundary area between the first and second object. The clearance surface segment is determined from the location of the first and second object and clearance criteria. The clearance surface segment is used to define a violation region.

Another example is a portable device for analyzing whether an object violates a clearance criteria in an area. The device includes a laser rangefinder that determines the position of the object relative to the portable device via a single laser shot at the object. A position data interface determines the position of the portable device. A storage device stores clearance surface data including a map of the area having clearance surface boundaries. A controller determines the position of the object based on the position of the portable device obtained from the data interface and the position of the object relative to the portable device obtained from the laser rangefinder. The controller determines whether the object violates clearance criteria.

Another example is a method of determining whether an object in an area violates a clearance surface. A map of the area including clearance surface data is loaded on a mobile device. The position of the mobile device is determined electronically. The position of the object is determined via a single shot from a laser range finder to the object and the determined position of the mobile device. The position of the object is compared to the loaded map to determine whether the object is a violation of the clearance surface.

Another example is a machine readable medium having stored thereon instructions for producing a clearance surface in a region having a first and second object in a right of way. The medium includes machine executable code which when executed by at least one machine, causes the machine to retrieve digital image data taken from a three-dimensional topographic image of the region, the region including terrain, the right of way and the first and second objects. The code causes the machine to locate waypoints to define a centerline and a boundary area to be analyzed. The code causes the machine to determine vegetation coordinate points in the region from the digital image data. The code causes the machine to determine ground coordinate points from the digital image data. The code causes the machine to construct a clearance surface segment within the boundary area between the first and second object. The clearance surface is determined from the location of the first and second object and clearance criteria. The code causes the machine to use the clearance surface to define a violation region.

Additional aspects will be apparent to those of ordinary skill in the art in view of the detailed description of various embodiments, which is made with reference to the drawings, a brief description of which is provided below.

Figure 1:
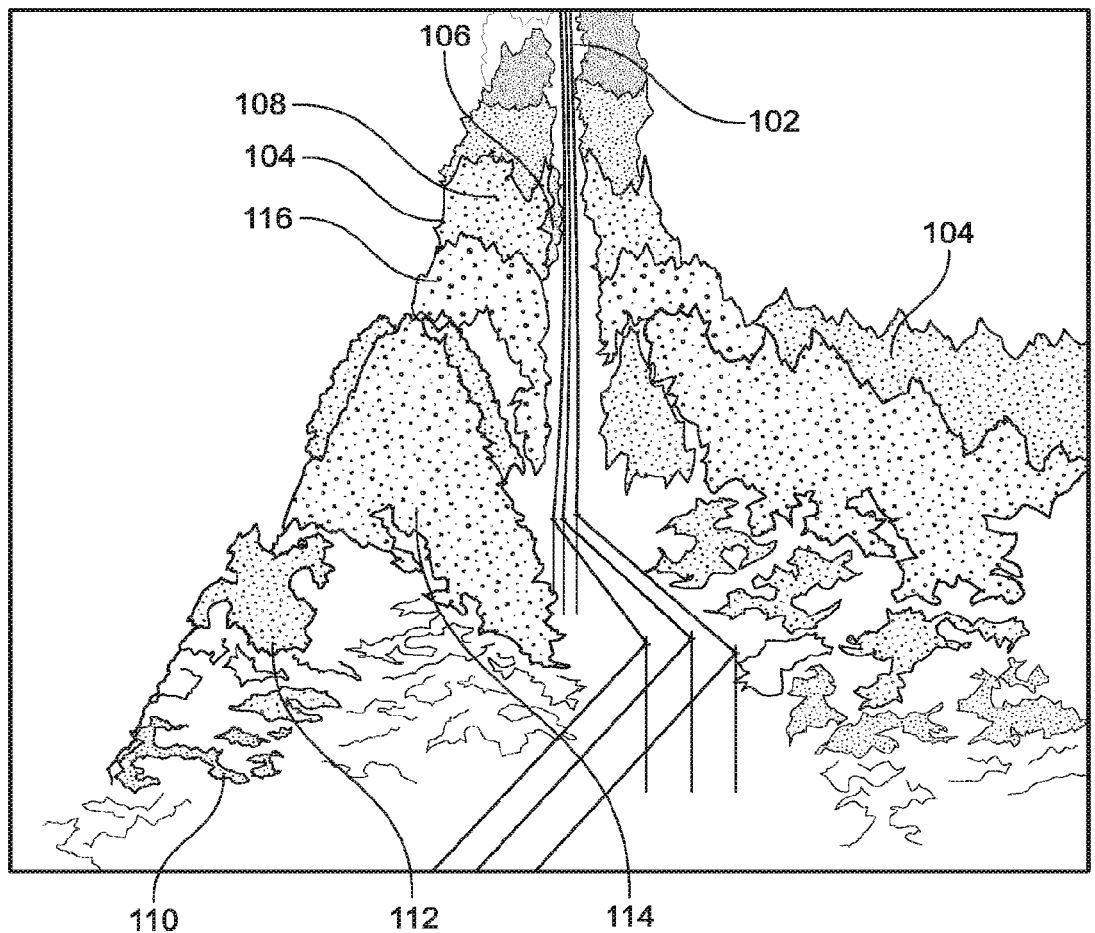
FIG. 1 is an illustration of an unclassified LIDAR point cloud of an electric power transmission line in its right of way area going through a forest for use by the disclosed method.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

The present described process automatically produces a right of way map with clearance data. Generally the analytical process involved in determining a vegetation violation includes transforming from a point-to-point distance determination along with a comparison of that point-to-point distance to a specific clearance distance criteria into a clearance surface solution for all possible locations at which a clearance violation could exist. The clearance surface, specific to a particular conductor operating condition, divides three-dimensional space into a violation region and a non-violation region. It is determined whether or not a vegetation data point(s) exist either on the clearance surface or within the violation region (e.g., a violation). A model/data structure is provided along with an analysis capability that significantly reduces the storage and computing power requirements necessary and sufficient to support the required analysis. A results presentation format is provided that significantly reduces the data volume of the results while making the results easy to interface to existing geographical information systems (GIS) data management/presentation methods as well as interface with work scheduling mechanisms.

The analytical process involves using general industry-accepted techniques for defining right of way geometry. Waypoints are located to define the centerline of a corridor (right of way) and its bounded area of interest. Conductor catenary curves are determined (from classified LIDAR point clouds or some other appropriate means) to define the spatial location of points along the conductor(s) at one or more specific operating conditions such as temperatures. Vegetation coordinate points are determined from classified LIDAR point clouds or some other appropriate means and stored for subsequent assessment. Bare earth or ground coordinate points are determined from classified LIDAR point clouds and stored for subsequent analysis.

Three-dimensional, edge-matched clearance surface segments are constructed for each specific conductor operating condition/temperature of interest, to define spatial regions which could contain coordinate points which either represent clearance violations or do not represent clearance violations. The constructed clearance surface(s) are segmented (based on centerline and right of way boundary definitions) to facilitate efficient data storage and access. The bare earth coordinate point data are segmented (based on centerline and right of way boundary definitions) to facilitate efficient data storage and access. The segmented clearance surface(s) are used to analyze each available vegetation point and determine whether or not each specific vegetation point violates the specific clearance criteria for the conductor operating condition being analyzed. The analysis results which are violations are "clustered" to reduce data volume while preserving the identity/location of the violating vegetation/trees. The segmented clearance surface(s), analysis results, and bare earth data (the data model contents) are transferred to a handheld computing device via a data storage card for example. The handheld computing device is used for performing the inspection/analysis in the field such as on-the-spot at which new measurements are taken.

The specific aspects of the above mentioned method with respect to determining violations of a right of way will be discussed in detail with regards to FIGS. 1-7. FIG. 1 is an illustration of an unclassified LIDAR point cloud (point coordinates) of an electric power transmission line 102 in its right of way area going through a forest 104. The different colors 106, 108, 110, 112, 114, 116 and 118 in FIG. 1 depict only the elevations-above-sea level of each individual LIDAR point in the point cloud. The elevations are color coded such that points at lower elevation are colored violet 106 while the points at the highest elevation are colored red 116. In this example, the colors of the spectrum, violet 106, indigo (not shown), blue 108, green 110, yellow 112, orange 114, and red 116 are used to indicate elevation. At this point in the data processing scheme, each of the individual LIDAR points defines a point in three-dimensional space (x, y, z), but no single point has been associated with the "named" or type of object it belongs to and therefore each points remains unclassified. Before any type of analysis can be accomplished using this type of point coordinate data, each point in the point cloud must be classified according to the type of object the particular point is a part of.

Figure 2:
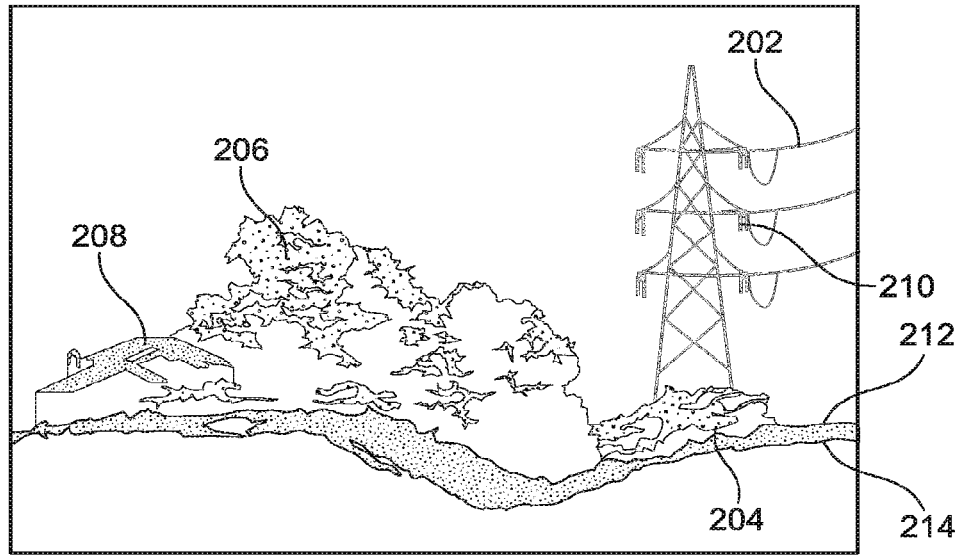
FIG. 2 is an illustration of an example of a classified LIDAR point cloud of an electric power transmission line in its right of way area going through a populated area.

FIG. 2 is an example of a classified LIDAR point cloud (point coordinates) of an electric power transmission conductor 202 in its right of way area 204 going through a populated area. At this point in the data processing scheme, each of the individual LIDAR points defines a point in three-dimensional space (x, y, z); and each individual point has been associated with the "named" object to which it belongs. In this example, the white colored points 206 belong to objects classified as "vegetation," the red colored points 208 belong to objects classified as "rooftops," the bright green colored points 210 belong to objects classified as "electric power transmission facilities," and the darker green colored points 212 belong to objects classified as grasses (very close to the ground) and the darker maroon colored points 214 belong to objects classified as "terrain" or "bare earth."

A point's classification determines: a) how it will be treated relative to each other point; and b) what clearance criteria should be applied. For instance, a point location that is classified as a vegetation point location 206 can be compared spatially with one or more point locations that are classified as a conductor point location 202 (or vice versa) in order to determine whether or not the vegetation point location poses a threat to the conductor's point location based on the required clearance requirement that must be maintained. Comparing the location of one vegetation point location with another vegetation point location is not of interest in this analysis. Determining the spatial relationship between vegetation point locations and ground/bare earth point locations are necessary to determine the height above ground of the particular vegetation point of interest. Additionally, even houses, fences, other power poles, and even the ground may pose a threat to the integrity of the operation of the electrical conductor 202 under certain conductor operating conditions. Thus, determining whether or not a point in space violates the clearance criteria for the electrical conductor under various conductor operating conditions is of interest.

Figure 3:
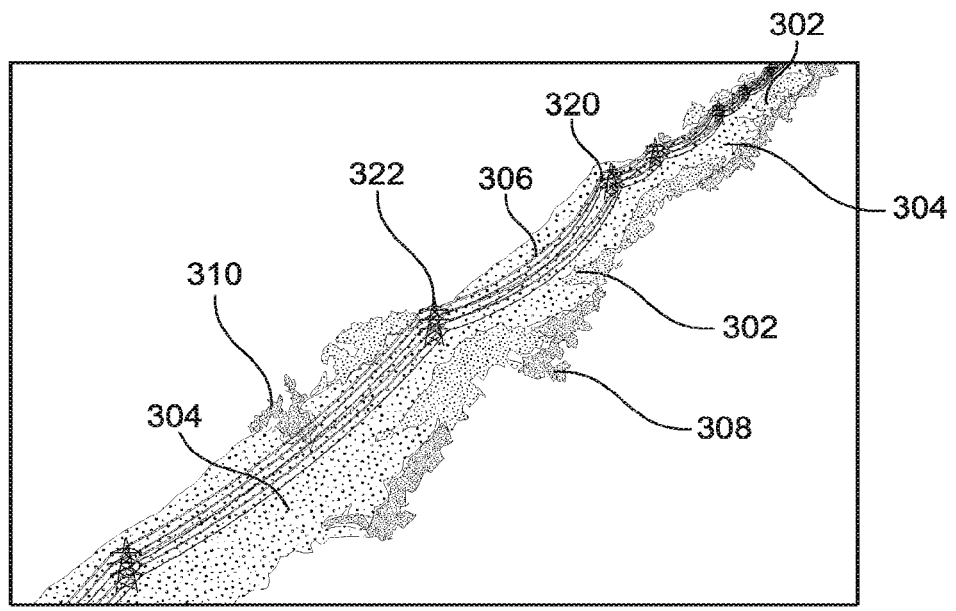
FIG. 3 is an illustration of the clearance surface(s) constructed with respect to the right of way area and supporting structures/conductors relative to the coordinate point data that may be available.

FIG. 3 shows an example of coordinate point cloud data, which in this example is airborne LIDAR data that was captured along a specific right of way 302 along with a constructed clearance surface or surfaces 304. In FIG. 3, the coordinate point cloud data has been classified into specific object categories including structures 322 and a conductor 306 for an electric power transmission line, bare earth or ground data points 308 representing the terrain, and vegetation 310 including grasses/weeds, brush, and trees. Other manmade structures (obstructions/encroachments) are often found within the coordinate point cloud. These manmade structures could be considered to be violations of any specific conductor clearance criteria being analyzed/applied to their classification.

As shown in FIG. 3, the clearance surfaces relate directly to the electrical conductors and associated supporting structures. In this example, there is one clearance surface per span. As such, the clearance surface(s) 304 represent a semi-permanent asset of the owner. Thus the clearance surface or surfaces may be used and re-used well into the future until either the geometry or the operating conditions of the conductor are changed. The clearance surface(s) is constructed based on the geometry of the conductors and the specific vegetation clearance criteria but not on the spatial relationship with the surrounding vegetation data points.

Since the clearance surface is constructed using the geometry of the electrical conductor 306 at a specific conductor operating condition and the specified clearance criteria (depending on point classification), the unique clearance surface will remain as a semi-permanent asset as long as the physical geometry of conductor attachment points (on the supporting structure) is not changed, the conductor operating temperature(s) being analyzed are not changed, and the clearance criteria (for a particular point classification of interest) are not changed. However, construction of clearance surfaces for the determination of violations of vegetation clearance criteria is of interest even though the same approach would be taken to construct other clearance surfaces for other classifications of object coordinate points using conductor clearance criteria unique and particular to such other object point classifications.

The clearance surface is constructed uniquely for each span in this example. The span is the right of way area between two consecutive structures that support the electrical conductors 306, such as lattice towers 320 and 322 in FIG. 3. The clearance surface may be extended out beyond the boundary of the right of way as far as necessary to take into account taller (hazard) trees that could fall into the right of way and threaten the integrity of the electrical conductors 306. The clearance surfaces are constructed to follow the catenary shape of the electrical conductors 306 and whatever the conductor operating condition (operating temperature) to be analyzed. Multiple conductor operating conditions may be considered for a single analysis. These conductor operating conditions may include the condition "as flown" or "as measured" or "as inspected." The operating conditions may also include the sag or blowout of the conductor 306 at maximum operating temperature and/or maximum wind/blowout conditions.

The clearance surface(s) effectively divide space into contiguous, seamless regions containing coordinate points that either violate the conductor clearance criteria or do not violate the conductor clearance criteria. Therefore, the construction of the clearance surface is not dependent on its relative proximity to either the vegetation coordinate points or to coordinate points on manmade objects either inside or outside the rights-of-way. The clearance surface represents the collection of all points in space that just barely violate the conductor clearance criteria. Therefore, all vegetation coordinate points (or manmade object coordinate points) that lie on the clearance surface or are above the clearance surface are coordinate points that violate the specific conductor clearance criteria being analyzed. The clearance surface is a seamless surface that is constructed along the shape of the sagging conductor 306 at one or more conductor operating temperatures or conditions in this example. The conductor operating condition may take into account the wind loading, ice loading, solar heating, and electrical loading of the conductor 306 as may be applicable to the particular analysis/investigation of interest. It is practical and desirable to analyze multiple conductor operating conditions and multiple conductor clearance criteria concurrently.

The outward expanse of the clearance surface construction, expressed as the distance from the right of way centerline, is necessary to determine whether or not a vegetation coordinate point or a coordinate point on a manmade object represents a conductor clearance violation. The point's height above ground is of interest, because taller objects can fall farther in a direction toward the electrical conductor. The extension/expanse of the clearance surface construction outward from the centerline may be different at the structure locations and at the point of maximum conductor sag. The risk of vegetation clearance violation may be considered to be less in the vicinity of the structure with a higher elevated point than it might be at the location of maximum conductor sag which generally is located near the middle of a span. However, this level of risk assessment is determined by a user. Often, the clearance surface will be extended farther at the "mid-span" location of maximum conductor sag and less at the structure location as shown in FIG. 3.

Since it is easier for a forester to estimate the height of an object above the ground rather than to estimate an object's elevation above sea level, the bare earth coordinate data plays an important role in the presentation of the clearance surface construction results. The final presentation of the clearance surface results depicts the clearance surface(s) in terms of their height above ground at all clearance violation locations above the right of way.

Figure 4A:
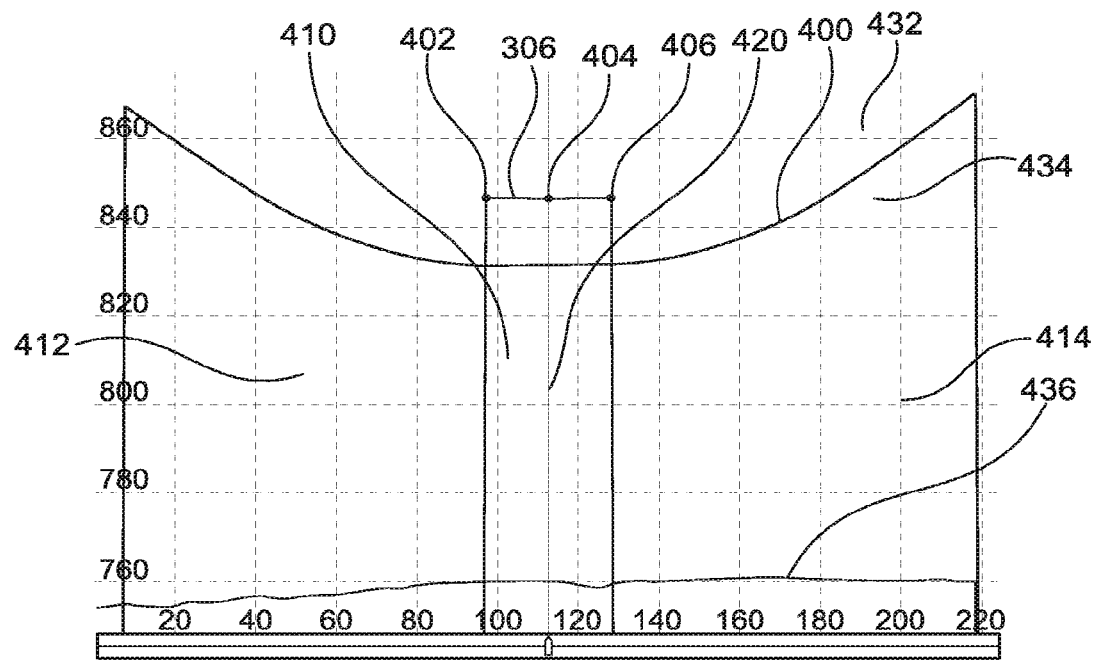
FIG. 4A is an illustration of a cross-section of the clearance surface taken perpendicular to the right of way centerline of the electric power transmission line shown in FIG. 3.

FIG. 4A is an illustration of a cross-section of a clearance surface 400 taken perpendicular to the right of way centerline or alignment of an electric power transmission line 306 shown in FIG. 3. FIG. 4A shows the positions of three primary conductors 402, 404 and 406 of the electric power transmission line 306 at the time the data was captured (e.g., the as flown or as measured conductor operating condition/temperature). The area directly under the three conductors 402, 404 and 406 is termed a wire zone 410. Two border zones 412 and 414 extend beyond the wire zone 410 on either side. The border zones 412 and 414 extend out to or toward the boundary of the right of way. The boundary of the right of way is not shown discretely in FIG. 4A, because the right of way boundary location itself is not important to the construction of the clearance surface except to the extent that the clearance surface needs to extend beyond that boundary. Tall objects such as trees grow beyond the boundary of the right of way, and some of these taller objects/trees may present a threat to the power line. The conductor configuration is horizontal for the single circuit electric power transmission line 306. In this example, the right of way is symmetrical, in the plan view, about a right of way centerline 420. It is to be understood that the right of way does not have to be symmetrical in order to utilize the described process.

The clearance surface cross-section in this example is represented by a line 400 which divides the chart into a violations region 432 containing vegetation points that represent violations of the radial clearance criteria and a non-violations region 434 containing vegetation data points that represent non-violations of the radial clearance criteria. A cross-section of the ground or bare earth surface 436 is shown in FIG. 4A, because tall objects such as trees stand on the ground. When tall objects fall in the direction of the power lines, the falling objects pivot about some point on the ground and this affects the shape of the calculated points on the clearance surface. Coordinate points that lie on or above the cross-section of the clearance surface 400 represent violations of the radial clearance criteria. A tall object or tree reaching a height-above-ground equal to or greater than the height above ground of the clearance surface 400 would, if it fell, violate the radial clearance criteria. Optionally, the lifting/thrusting effect of the rootball of the falling tree may or may not be taken into account during the execution of the analysis.

In this example, the units of measure are the US Survey Foot in FIG. 4A. The clearance surface geometric modeling concept is equally suited to transmission line construction techniques featuring multiple circuits, vertical conductor configurations, right of way layout configurations that are not symmetric about the right of way centerline 420, and other variations.

When constructing the clearance surface, it is convenient to construct three components of the continuous clearance surface for a single span. A span is the area contained within the boundaries of the right of way between two consecutive supporting structures. The span's conductors hang (sag) between the supporting structures, and the conductors run essentially parallel to the centerline. The continuous clearance surface is a gridded surface constructed in parallel cross-sections perpendicular to the centerline in this example, but other constructions may be used. The grid spacing can be varied, but a 2 foot to 3 foot grid cell size is completely sufficient for the intended analysis of vegetation point cloud data.

The three component surfaces that compose the span's clearance surface are associated with the wire zone 410, the left-side border zone 414, and the right-side border zone 412. The wire zone clearance surface component is constructed as a grid bounded by the outermost conductors, in the case of a horizontal conductor configuration using a radial clearance criteria. Each of the border zone clearance components is edge-matched to the wire zone surface component. If desired, a horizontal safety distance could be added to extend the wire zone, the border zone or both.

To construct the surface components, the process starts at a structure and proceeds by constructing one surface cross-section at a time, proceeding from the starting structure to the ending structure of the span. At the starting structure, the wire zone cross-section component is created by placing equally spaced grid points along a line between corresponding points of the two outermost conductor catenary curves. Thus, the surface cross-section is essentially perpendicular to the right of way centerline 420. To account for turns along the centerline, the bisecting angle of the turn becomes the cross-section alignment at the starting structure, and the surface's cross-sectional alignment is incrementally rotated for successive cross-sections until the surface cross-sectional alignment becomes parallel to the bisecting angle of the turn at the opposite end of the span (at the span's ending structure location). Of course, when no turns are encountered for several spans, the clearance surface's cross-sectional alignment is perpendicular to the centerline 420.

The clearance surface construction process proceeds from the beginning to the ending structure in the span in equal incremental steps along the centerline 420. At each successive incremental step along the centerline 420, the wire zone surface component, the left-side border zone component, and the right-side border zone component are constructed as cross-sections of equally spaced grid points. As surface grid lines are added along the centerline, the elevation (or sag) of the conductor's catenary curves (dependent on conductor operating temperature) controls the shape of the clearance surface; and as steps are taken along the surface cross-section (e.g., boundary to boundary and beyond), the ground surface and the clearance criteria combine to influence the shape of the cross-sectional line of grid points. Thus, the completed clearance surface is a three-dimensional delimiting surface between two spatial regions, the violations region 432 that includes vegetation clearance criteria violations and the non-violations region 434 that does not contain vegetation clearance criteria violations. Vegetation points that lie on the clearance surface are defined as violations of the clearance criteria. Thus, the clearance surface embodies the complete geometry of the conductors (the asset to be protected) while it also contains the information necessary and sufficient to analyze each and every vegetation point that could present a threat to the protected asset. The clearance surface is the solution of all possible violations of the clearance criteria as applied to the three-dimensional space of the right of way or corridor.

Figure 4B:
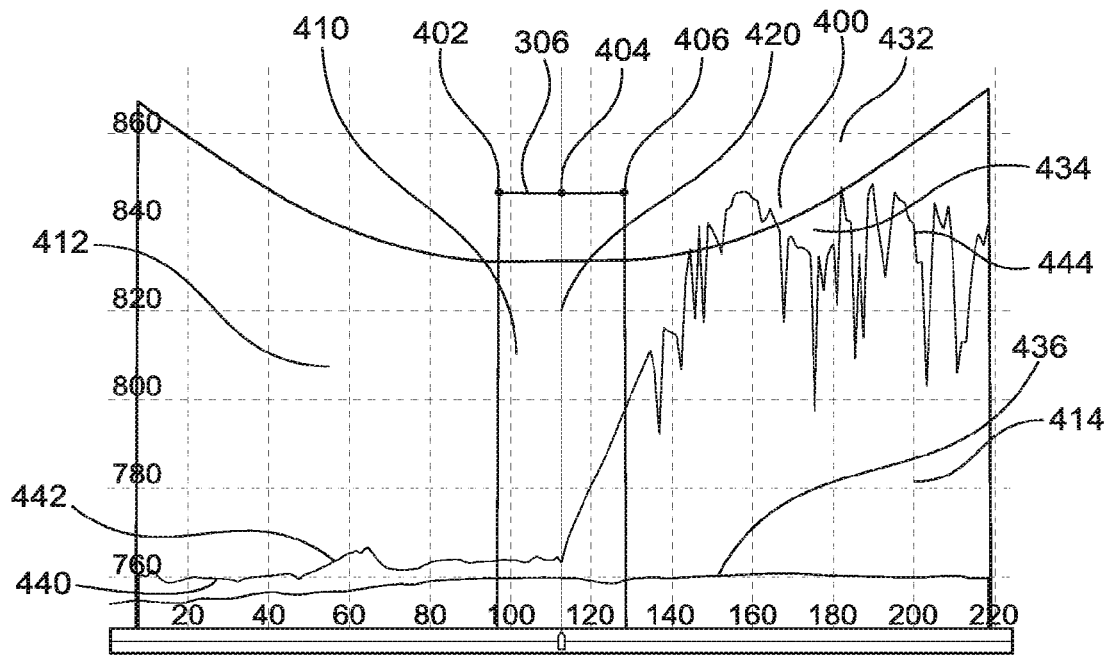
FIG. 4B is an illustration of the cross-section in FIG. 4A with the addition of data points of a vegetation canopy.

FIG. 4B is the same illustration as FIG. 4A, with the addition of a cross-section of a vegetation canopy 440. As may be seen in FIG. 4B, a cross section of a trees canopy 442 on the left side is shorter than a tree canopy 444 on the right side. The points on the tree canopy 444 that are above the clearance surface 400 represent points on a tree such that if that tree fell toward the conductors, the points would violate the radial clearance criteria, assuming that the pivot point were on the ground surface directly below the point of interest. Since not all "falling" points are positioned directly above the pivot point of a falling tree, this analysis presents a conservative, yet typical and effective approach to the analysis of the point cloud data.

The efficiency of the clearance surface model is illustrated as follows: Vegetation points that lie on or above the clearance surface 400 such as certain of the tree canopy 444 are violations of the clearance criteria while points that lie below the clearance surface 400 are not violations of the clearance criteria. Thus, the analysis approach is simplified to the determination of the signed elevation difference between a vegetation point as it exists in three-dimensional space and its closest interpolated neighbor point on the clearance surface.

Figure 4C:
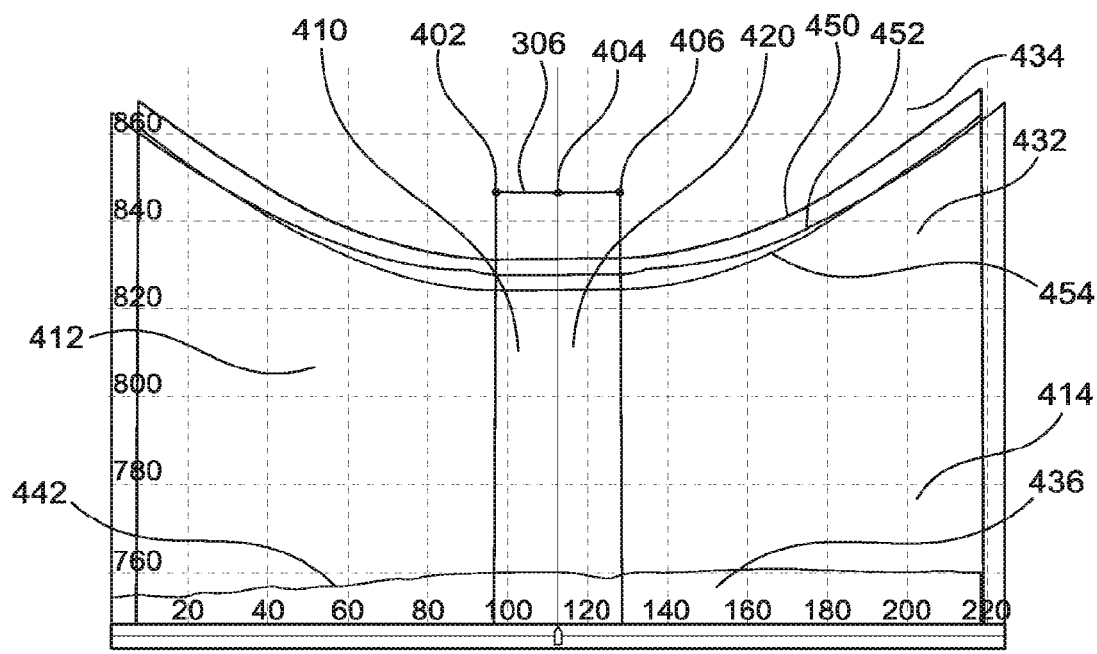
FIG. 4C is an illustration of a cross-sections of three clearance surfaces that were constructed similarly to represent three different conductor operating conditions.

FIG. 4C is a cross section view of three clearance surfaces that were constructed similarly (e.g., using the same radial clearance criteria) to represent three different conductor operating conditions. Like elements in FIG. 4C are labeled with like element numbers as in FIGS. 4A-4B. A first line 450 represents the as flown/as measured operating condition/temperature as shown in FIGS. 4A-4B. A second line 452 is the max-blowout operating condition which has a different conductor operating temperature along with a lateral wind loading that "blows out" the conductor or causes the conductor to "swing out in the wind." A third line 454 represents the maximum sag operating condition which corresponds to the maximum anticipated conductor operating temperature.

All three of the clearance surfaces shown in FIG. 4C are constructed in the same fashion except that the "blown-out" region of the max blowout surface 454 is uniquely constructed, taking into account the length of the insulator and whether or not the insulator is or is not constrained from swinging. The blown-out region of the surface defines the entire bounding envelope of the conductor as it swings out due to the wind loading. The blown-out region of the surface is a continuous gridded surface segment of the clearance surface border zone component. In this example, the conductor operating temperatures chosen to illustrate the different shapes of the clearance surfaces for the three different named conductor operating conditions were chosen for convenience of dealing with the named surfaces in a particular order (e.g., as flown/as measured, maximum blowout, and maximum sag) and these operating temperatures do not necessarily represent specific real-world conditions (e.g., a high wind would actually cool the conductor down, perhaps to a temperature below that of the as flown/as measured condition). That is, the maximum blowout clearance maintains the clearance criteria but is lower than the as flown/as measured clearance surface because of the increased conductor sag of the maximum blowout due to a higher conductor operating temperature, and so the relative spatial relationship between the maximum blowout clearance surface and the maximum sag clearance surface.

Figure 4D:
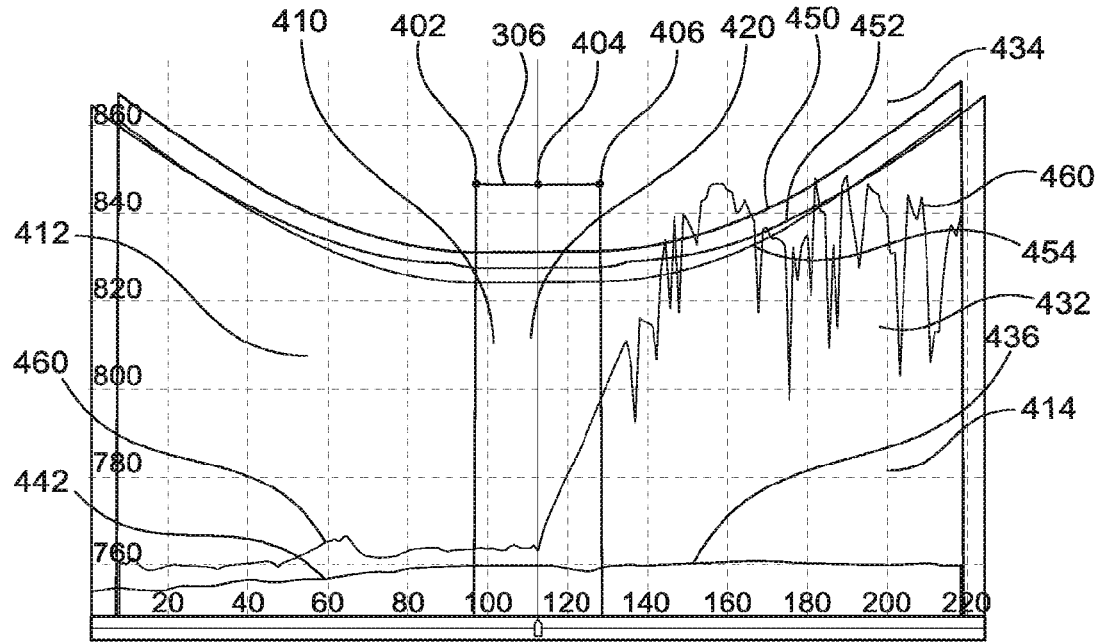
FIG. 4D is an illustration of the cross-sections in FIG. 4C with the addition of data points of a vegetation canopy.

FIG. 4D is an illustration adding a cross-section of a vegetation canopy 460 to the illustration in FIG. 4C. On the left side of FIG. 4D, the trees canopy of the vegetation canopy 460 is shorter than the tree canopy of the vegetation on the right side 460. Again, the efficiency of each clearance surface model is illustrated in this example. Vegetation points that lie on or above the applicable clearance surface 450, 452 or 454 are violations of the clearance criteria while points that lie below the applicable clearance surface are not violations of the clearance criteria. Thus, the analysis approach is simplified to the determination of the signed elevation difference between a vegetation point as it exists in three-dimensional space and its "closest" interpolated neighbor point on the clearance surface.

Figure 5:
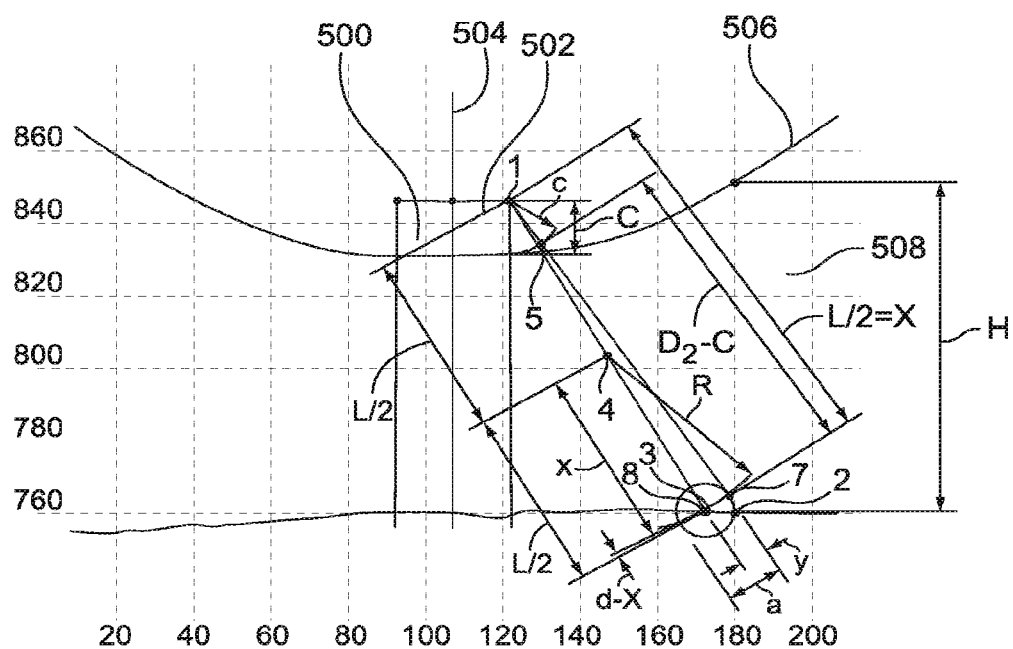
FIG. 5 is a graph illustrating the "radial" clearance surface construction process using radial clearance criteria.

FIG. 5 illustrates the "radial" clearance surface construction process using radial clearance criteria. Similar to FIG. 4A, the cross-section in FIG. 5 includes a wire zone 500 with conductors 502 which are centered around a right of way centerline 504. A line 506 represents the clearance surface. The clearance surface for each span will be constructed for each conductor operating condition (temperature) being modeled and subsequently analyzed. Before the clearance surface(s) can be constructed, the following geometric and spatial data must be known: 1) radial clearance criteria for each conductor operating condition (temperature) to be analyzed; 2) ground surface or digital terrain model; and 3) catenary curves describing the geometry (location of discreet points) of the conductor(s) for each span along the entire length of the right of way to be modeled.

A critical part of the method of constructing the clearance surface 506 is the determination of its height (directly above the location of the base of the tree on the ground) at which a tree is found to be a violation of the clearance criteria. That is, the use of the method to determine the location of the vegetation's minimum "allowable" height above ground not only locates a point on the clearance surface 506, but also it identifies the location of the vegetation violation. This applies for the radial clearance criteria as well as for the NESC clearance criteria.

The surface construction process begins with the construction of a "border zone" extension 508 of the clearance surface for one of the most outboard conductors for a single span located at the beginning end of the right of way to be modeled (e.g., starting station distance along the centerline is equal to zero). A working catenary point is established by starting at the first (behind) structure location (on the centerline) and moving in a direction perpendicular to the centerline 504 outboard to a point (Point #1) which represents a point on the most outboard conductor. Assuming a suspension insulator, this conductor attachment point is located on the conductor catenary curve. Point #1 is now the working catenary point. A second point (Point #2) is established on the ground surface cross-section directly below Point #1. Point #2 is now the working ground surface cross-section point. Point #2 represents the base of a falling tree. Successive clearance surface points are constructed directly above ground surface cross-section points moving repeatedly (in equally spaced steps) out along the ground surface cross-section.

A third point (Point #3) is established on the ground surface cross-section by moving from Point #2 (base of a falling tree) back along the ground surface cross-section toward the centerline 504 a horizontal distance equal to the rootball radius (r) of the falling tree. Point #3 represents the pivot point about which the falling tree will rotate if and when it falls toward the conductors 502. The ground elevation at the base of the falling tree (Point #2) will likely be above or below the elevation of the pivot point (Point #3) of the falling tree, located at the edge of the rootball because the ground cannot be assumed to be level. The elevation difference between Point #2 and Point #3 is determined as $E$=(Elevation of Point #3)−(Elevation of Point #2), a signed value A vector V13 is established between Points 1 and 3 as V13=P1P3 in this example. The magnitude of vector V13 is computed. L is assigned |V13|. A point (Point #4) is established on the vector V13 at a distance (from Point #1) equal to one half the magnitude of vector V13. d is assigned as |V13|/2=L/2. Point #4 will be used as a center construction point for a circle of radius R, where R=L/2.

$d=(L/2)=R$

At Point #3, a circle of radius r is constructed where r=(rootball radius). In this example, this circle does not pass through Point #2 (base of the falling tree) due to the ground slope at the base of the tree. However, this circle (radius of r) does pass through a point which divides the chord of a larger circle (through Point #2) of radius r' into two equal parts of length E. The base of the falling tree lies on this larger circle of radius r'. The radius (r') of the larger circle is determined to be: r'=(r/cos(theta)), where theta=A TAN 2(E/r).

The radius (r') of the larger circle is of no significance to the surface construction method other than to make note that the horizontal line passing through the pivot point (Point #3) bisects the chord of the larger circle at a horizontal (radial) distance equal to r (the horizontal rootball radius). However, it is significant that the intersection point of the horizontal line through Point #3 and the chord of the larger circle will rotate counterclockwise about Point #3 to a Point #7 as the tree falls toward the conductor Point #1. The falling tree aligns to the line between Point #1 and Point #7, the line being the tangent line from Point #1 (the conductor) to the boundary of the smaller circle of radius r, the tangent point being Point #7.

The circle (radius R) centered at Point #4 is intersected with the circle (radius r) centered at Point #3 to locate the two intersection points that define the chord of the circle (radius r) centered at Point #3. The chord is the line between the two intersection points of the two intersecting circles. The length (and as such the half-length) of this chord is determined as follows:

$X^2+Y^2=R^2$ circle centered at Point #4 (1)

$(X-d)^2+Y^2=r^2$ circle centered at Point #3 (2)

The terms of equations (1) and (2) are combined.

$$(X-d)^2+(R^2-X^2)=r^2 \quad (3)$$

$$X^2-2dX+d^2-X^2=r^2-R^2 \quad (4)$$

X is solved for.

$$X=(d^2-r^2+R^2)/(2d) \quad (5)$$

From equation (1), $$Y^2=R^2-X^2=R^2-[(d^2-r^2+R^2)/(2d)]^2 \quad (6)$$

$$Y=[(4d^2R^2)-(d^2-r^2+R^2)^2]/(4d^2) \quad (7)$$

Where Y is half the chord length and the entire chord length (a) is equal to $$a=(1/d)[(4d^2R^2)-(d^2-r^2+R^2)]^{1/2} \quad (8)$$

$$a=(1/d)[(-d+r-R)(-d-r+R)(-d+r+R)(d+r+R)]^{1/2} \quad (9)$$

Substituting for d (since d=R) results in $$a=(1/R)[(r^2-4R^2)(r^2)]^{1/2} \quad (10)$$

A distance ($D_1$) is defined from Point #1 to Point #8, where Point #8 is located at the intersection of vector V13 and the chord of the circle centered at Point #3.

$$D_1=(L/2)+X \quad (11)$$

A distance ($D_2$) is defined from Point #1 to Point #7 where Point #7 is an intersection point of the two circles constructed earlier.

$$D_2=[D_1^2+Y^2]^{1/2} \quad (12)$$

A distance from Point #1 is defined to the base of the falling tree.

$$D_3=D_2+E \quad (13)$$

The minimum height (H) of a falling tree located at Point #2 that will just fail to meet the specified clearance criteria (C) is defined as:

$$H=D_3-C=((D_1^2+Y^2)^{1/2}+E)-C \quad (14)$$

A Point #6 is established as a point on the clearance surface cross-section) at a height-above-ground (directly above Point #2).

The analysis continues to move outward from the centerline 504 in small equal incremental distances along the ground surface cross-section and continue to define points of the clearance surface cross-section. The analysis continues to move outward beyond the right of way or wire zone boundary 500 until a distance has been traversed sufficient to mitigate the threat of the tallest tree anticipated to exist along the edge of the right of way boundary. The above steps are repeated until the next consecutive structure is reached to complete the construction of the clearance surface component for the border zone of interest and beyond the right of way boundary.

The above steps are then repeated for the border zone region of the opposite side of the centerline 504. The clearance surface component within the wire zone 500 is constructed by constructing a grid of points between corresponding points on the two outermost conductor catenary curves while taking into account the "falling tree effect" as was done using the intersecting circle technique during the construction of the Border Zone clearance surface components. Clearance surfaces are constructed for each consecutive span in the entire line segment being modeled.

The mathematical treatment presented above applies to the radial clearance criteria. Another generally accepted type of clearance criteria is the NESC (National Electric Safety Code) criteria. Whereas the radial clearance criteria has only a radial component, the NESC criteria has both a horizontal and a vertical component (e.g., the violation zone is a box rather than a radial distance). The techniques for constructing the clearance surfaces using the NESC clearance criteria remain essentially the same as the techniques for using the radial criteria except for the determination of the value of H in equation 12. Thus, the value and usefulness of the clearance surface construction technique is extended to the use of the NESC clearance criteria as well.

Figure 6:
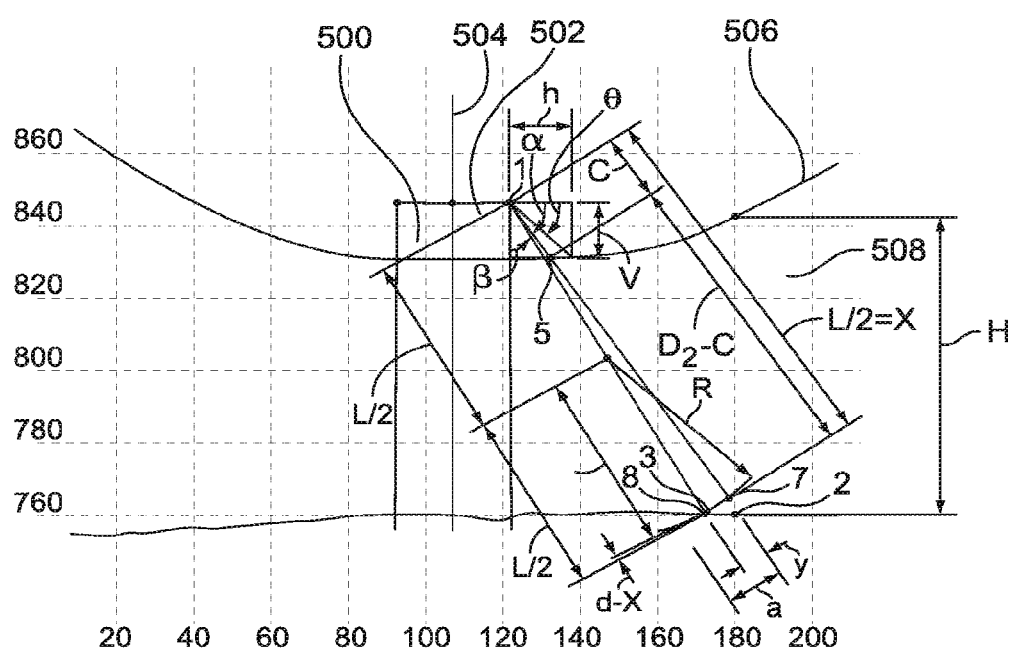
FIG. 6 is a graph illustrating the "NESC" (National Electric Safety Code) clearance surface construction process using NESC clearance criteria.

FIG. 6 is a graph illustrating the "NESC" (National Electric Safety Code) clearance surface construction process using NESC clearance criteria. A NESC clearance surface for each span will be constructed for each conductor operating condition (temperature) to be modeled and subsequently analyzed, just as is the case for the radial clearance criteria. Before the NESC clearance surface(s) can be constructed, the following geometric and spatial data must be known: 1) NESC clearance criteria for each conductor operating condition (temperature) to be analyzed; 2) ground surface or digital terrain model; and 3) catenary curves describing the geometry (location of discreet points) of the conductor(s) for each span (e.g., the right of way area between consecutive supporting structures) along the entire length of the right of way to be modeled.

The description of the surface construction process using the NESC clearance criteria is identical to the process for constructing the clearance surface(s) using radial clearance criteria in FIG. 5 above except for the determination of the value of the variable C as used in equation (12) to determine the height above ground for a corresponding point on the clearance surface. Since the NESC clearance criteria consists of both a horizontal and a vertical component, the value of the resultant clearance criteria C must be derived using both components.

Prerequisites for constructing the NESC clearance surface include a) determining the location of Point #5 and b) determining the location of Point #7, as shown in both FIGS. 5 and 6. The location of Point #7 is not a requirement for the construction of the radial clearance surface.

First Point #5 is located on either the horizontal or vertical boundary of an NESC clearance "box" depending on the location of Point #2. After Point #5 is located, a vector V15 is constructed from Point #1 to Point #5 and the magnitude of vector V15 is computed to determine the value of C. Now, the value of H is computed as specified in equation (12). The determination of the location of Point #5 proceeds as follows.

A horizontal unit vector $v_e$ directed outward from the working catenary point and in the vertical plane of the ground/surface cross-section. A vertical unit vector k is defined parallel to the z-axis. A unit vector $v_p$ is defined perpendicular to the vertical plane containing both the clearance surface cross-section and the ground cross-section while pointing in the general direction of increasing station distance along the span's centerline.

$$v_p=(-v_1)\times(+k), \text{ vector cross product of the unit vectors } v_1 \text{ and } k. \quad (15)$$

A vector $V_5$=P8P7 is defined and a unit vector $v_5=V_5/|V_5|$ is defined, where $$v_5=v_p\times(-v_1), \text{ vector cross product} \quad (16)$$

$$V_5=[(Y)v_5]=[(a/2)v_5] \quad (17)$$

Point #7 is defined as $P_7=P_8+V_5$ (18)

Vector $V_6$ is defined as $V_6$=P1P7, and unit vector
$$v_6=V_6/|V_6| \quad (19)$$

The angle "theta" is defined where w is defined as the length of the diagonal of the NESC $$\text{clearance criteria box, or } w = (h^2 + v^2)^{1/2} \quad (20)$$

$$(\text{theta}) = \cos^{-1}(h/w) \quad (21)$$

The angle "beta" is defined as $(\text{beta}) = \cos^{-1}[(v_6)\cdot(-k)]$, the dot product  (22)

The angle "alpha" is defined as $(\text{alpha}) = 90 - (\text{beta})$  (23)

If alpha>theta, $|V_7| = v/[\cos(\text{beta})] = C$  (24)

If alpha<theta, $|V_7| = h/[\cos(\text{alpha})] = C$  (25)

$$P_5 = P_1 + |V_7| V_6, \text{ and} \quad (26)$$

The minimum tree height above the ground to the NESC clearance surface is defined as $$H = (|V_6| + E) - C \quad (27)$$

Thus, different types of clearance criteria are used in the construction of the clearance surface.

Figure 7:
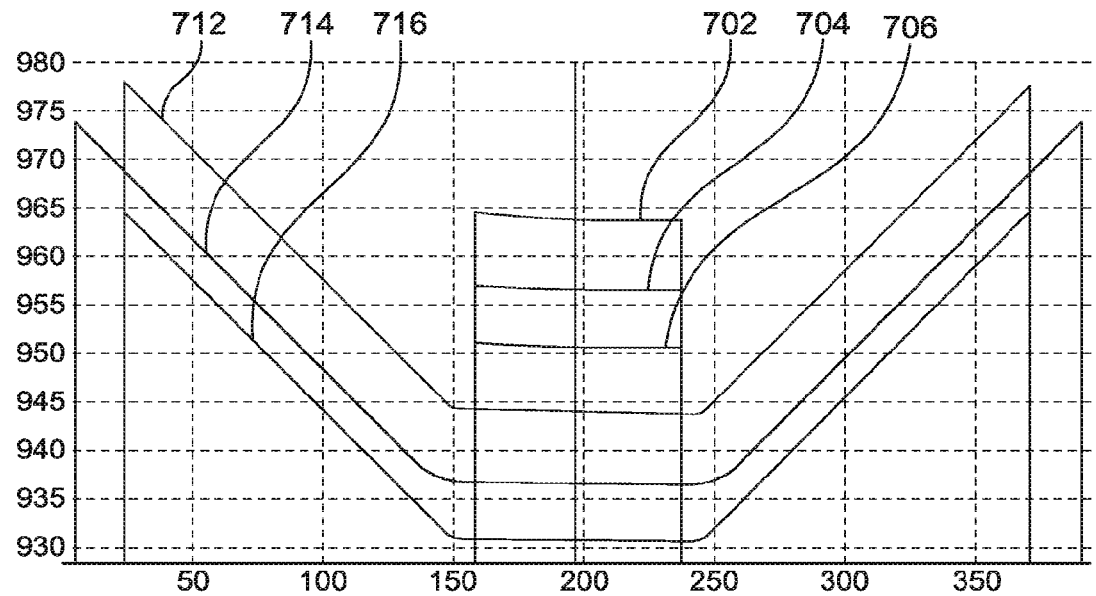
FIG. 7 is a graph illustrating the clearance surface construction process using a constant side slope angle procedure.

FIG. 7 illustrates the construction of the clearance surface using a vertical clearance criteria to establish the clearance surface in the wire zone and a constant slope angle (measured from the horizontal) for the construction of the clearance surfaces in the border zones. Additionally, a horizontal "safety" distance has been applied to extend the wire zone clearance surface horizontally outward from the centerline. FIG. 7 includes lines 702, 704 and 706 that each illustrate the conductor positions for three conductor operating conditions. In this example, the operating conditions are as flown/as measured, maximum blowout and maximum sag. FIG. 7 also shows lines 712, 714 and 716 representing the clearance surface cross-sections for the clearance surfaces constructed for each of the conductor operating conditions.

The constant angle construction of the clearance surface extending outward through the border zone and beyond the right of way boundary is a technique intended to make it quite easy for the field inspector to visualize whether or not a tree will violate the specified clearance criteria or not. This approach illustrates creating a clearance surface that delimits the space in the right of way into regions that do contain violations of the clearance criteria and regions that do not contain violations of the clearance criteria.

Figure 8:
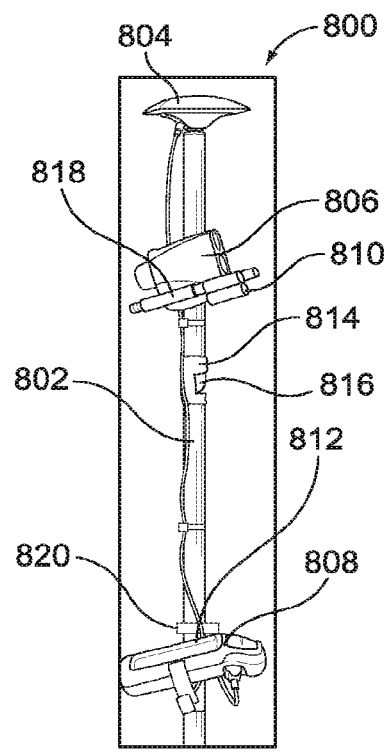
FIG. 8 is a perspective view of a handheld instrument that may use data, clearance surface models and analysis results obtained via the methods described herein.

The data obtained through the above analysis may be utilized by a handheld field inspection device 800 shown in FIG. 8. As shown in FIG. 8, the fully integrated handheld device 800 includes a non-magnetic staff 802 for conveniently attaching the various components of the handheld device 800. The device 800 includes a GPS antenna 804, a laser range finder 806, a handheld computer 808 and a detachable laser pointer 810. The handheld computer 808 includes a display screen 812. One example process involves taking a single measurement using a single-shot from the integrated laser range-finder 806 to determine the remote spatial (GPS) location of a potential violating vegetation point. The potential violating vegetation point is analyzed using software to determine whether or not the located vegetation point is or is not a violation based on the specified clearance criteria. The software accesses the stored clearance surface models to enable local processing by the integrated handheld computer 808 mounted on the device 800. The "pass (No Violation)/fail (Violation)" status of the captured/located vegetation point is presented using the display 812 of the integrated handheld computer 808 mounted on the non-magnetic staff 802. The geographic location of the failing (violation) vegetation point is plotted as a symbol on the graphics display screen 812 of the integrated handheld computer 808. The graphics display screen presents all captured vegetation points (failing and non-failing) in the form of a geographic map which also displays the GPS location of the user and handheld device 800 along with the centerline of the corridor/right of way, the right of way boundaries, structure locations within the right of way, and all vegetation violations that are known from earlier/previous analyses.

Upon return from the field inspection the vegetation points which represent clearance violations are downloaded, in both text and GIS/shape-file electronic format, to more permanent data storage facilities for further processing in an office environment. The field analysis results are transferred to a more permanent form of data storage for future use. These results may include the segmented clearance surface(s), the bare earth data, and information pertinent to the right of way of interest.

The integrated handheld device 800 also serves as a personal navigation aid for the user. The handheld unit 800 may carry a map of the right of way to be inspected in the field and displays/tracks the user's GPS position continuously with respect to the right of way being inspected. The integrated handheld device 800 also carries a digital camera (not shown) with which the user can take a picture of the vegetation violating the specified clearance criteria. Other objects of interest to the user may be documented as well. All photographs taken are geo-referenced to the GPS location of the user at the time the photograph is taken.

The integrated handheld device 800 may also include a cellular communications module in order to access real time kinematics ("RTK") survey networks that are used to improve the GPS location computations. Although it is not necessary to access available RTK networks for each and every use of the handheld unit 800, the RTK network access is sufficient to improve the accuracy of the GPS location determinations as may be required by the user of the handheld instrument. Additionally, the cellular communications capability may be used to transfer pictures and/or data back from the field to a home base of operations.

The laser range finder 806 includes a pistol grip 814 and integrated trigger 816 for firing the laser. The integrated trigger 820 fires the pivoting laser rangefinder 806 and results in less movement of the laser rangefinder 806 during the firing process than does a pushbutton firing mechanism. The laser range finder 806 is attached to the non-magnetic staff 802 using a clamp 818 capable of swinging through a vertical arc while remaining fixed otherwise (e.g., it cannot maneuver/swivel through a horizontal angle or arc). The laser range finder 806 is used to make multiple measurements from the user's position to the position of the vegetation point of interest or other object of interest. The position data may include range to target, azimuth from north, and declination angle from the user's eye position to the target position.

The handheld computer 808 is clamped into an adjustable mounting bracket 820 so that its horizontal and vertical orientation may be changed to suit the working conditions of the user. The handheld computer 808 may include a personal GPS navigator and a right of way map provider. The handheld computer 808 may include software that performs vegetation violation assessment/analysis, vegetation violation reporting, storage of data representing vegetation violation. The computer 808 may also include an interface for communication of the data and a camera for image documentation of the vegetation violation. The laser pointer 810 allows the user to designate the vegetation violations to a spotter who is responsible for flagging the violation for further clearing action.

Figure 9A:
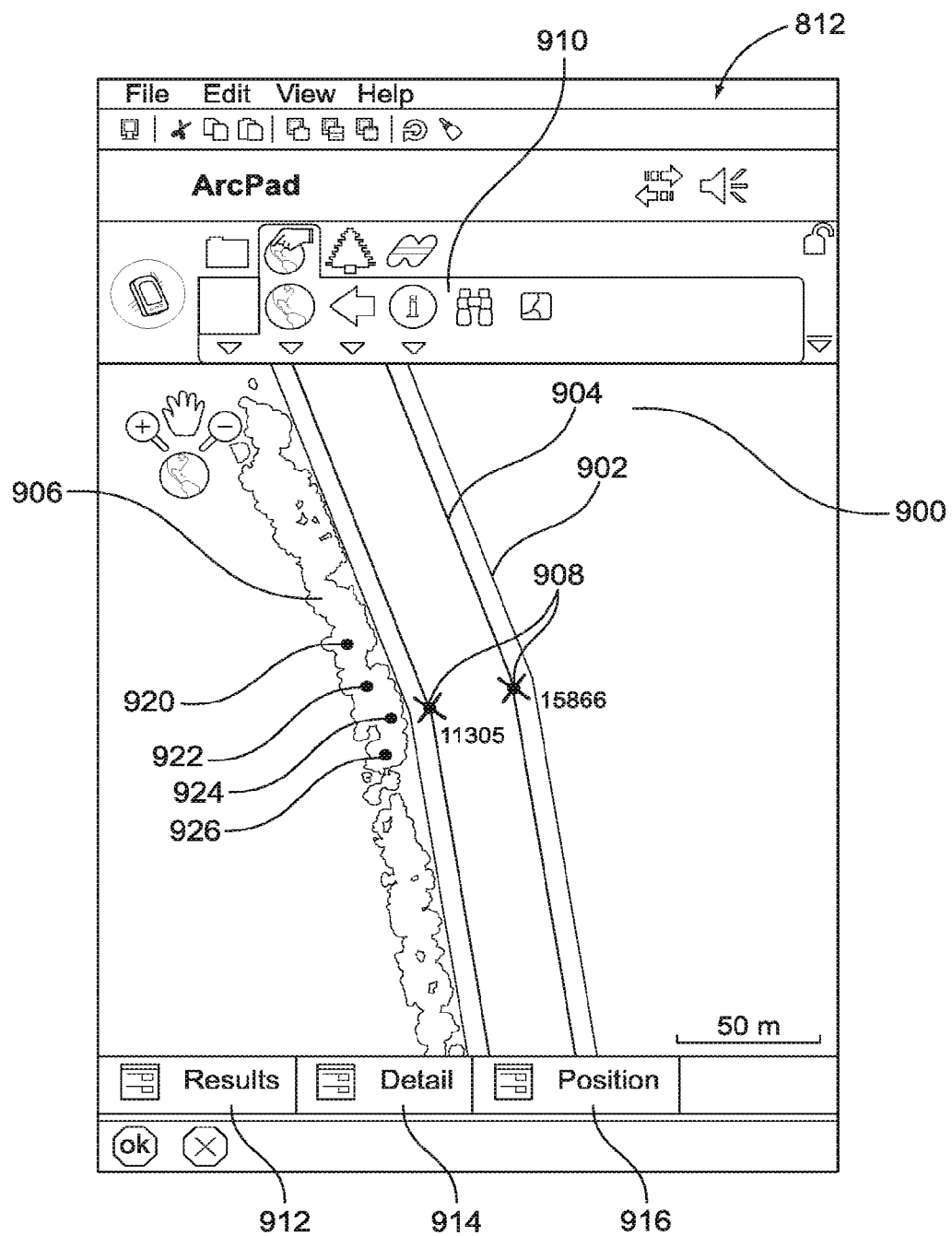
FIG. 9A is a view of the display of the handheld instrument of FIG. 8 showing a map with position data.

FIG. 9A shows a map display 900 that may be shown on the display screen 812 of the handheld computer 808. The display screen 812 in this example is configured to display graphics to use the handheld device 800 as a personal navigation tool by being a GPS guide to the area or target of interest. The display screen 812 may show the GPS location of the user relative to the map display 900 showing a right of way relative to vegetation/objects that have been identified/located as violations of the specified clearance criteria. In this example, the right of way is defined by boundary lines 902. The conductors are represented by lines 904. Mapped vegetation 906 is in violation of the clearance criteria and is shown graphically relative to the right of way 900 and the conductors 904. The display screen 812 may document or map the results of the user's actions to identify and locate clearance violations. Mapped structures 908 are displayed along with identification numbers.

The map display 900 includes a map control bar 910 which includes controls such as zoom in, zoom out, information, and view. The display 812 also includes a results tab 912, a detail tab 914 and a position tab 916 that allows the user to navigate between different displays. In this example, the position tab 916 is selected to display the map display 900.

The user locates his position in the area of interest within the right of way 902 by monitoring the GPS location on the display screen 812. While in position, the user may use the handheld device 800 to accomplish several tasks. The user may verify the results of a previous analysis such as by taking measurements of previously identified/located vegetation violations to ensure that none were missed. The user may audit the results of a clearing/trimming action such as by visiting the locations of known violations to see that they were in fact removed by the clearing action or they were not removed. The user may perform a new inspection/assessment of the vegetation in the right of way. Usually, this work would be performed after considerable time had passed and the vegetation had time to grow back to become a new violation.

With reference to FIG. 8, while in position, the user may scan the vegetation before him to select a piece of vegetation that appears to be a threat to the electrical conductor. The user aims the laser range finder 806 at the selected piece of suspect vegetation and squeezes the trigger once to measure the distance from the laser range finder to the target, the azimuth from north to the target, and the declination angle from the forester's eye to the target. The user may reference the map 900 on the display screen 812 to see what status (violation/no-violation) has been determined by the analysis method for the single-shot measurement. Additional information for the particular "shot" may be observed by advancing through various screens of the display after each "shot." This process may be repeated for each piece of suspect vegetation identified.

After each shot of the laser range finder 806, the handheld computer 808 updates the display screen 812 to display a symbol mapped to the remote location of the target and indicating the status of the assessment (violation/no-violation). In this example, the map display 900 in FIG. 9A shows four locations 920, 922, 924 and 926 which have been shot and their respective status. It is not necessary that the user look at the display screen 812 after each shot since the status of the shot is displayed by the appropriate symbols to indicate violation status. The laser range finder 806 provides user feedback (audible and visual) to indicate that a "shot" was made successfully or not. In fact, based on receipt of the feedback from the laser range finder 806, the user may continue to take multiple shots, one right behind the other, proceeding down the right of way or out beyond the right of way boundary as may be required.

After each shot of the laser range finder 806, the software of the handheld computer 808 determines the remote location of the target point either inside the right of way or outside the right of way and analyzes the remote target point (using the clearance surfaces) to determine whether or not the target violates the clearance criteria for the multiple conductor operating conditions being analyzed. The analysis performed may include grow-in and/or fall-in violations. The computer 808 analyzes the remote target point to determine whether or not the vegetation point is a violation of the allowable vegetation height in the right of way and/or edge-growth/encroachment clearance criteria. The various criteria are user defined and selected. The computer 808 also stores the results to an internal storage device.

Figure 9B:
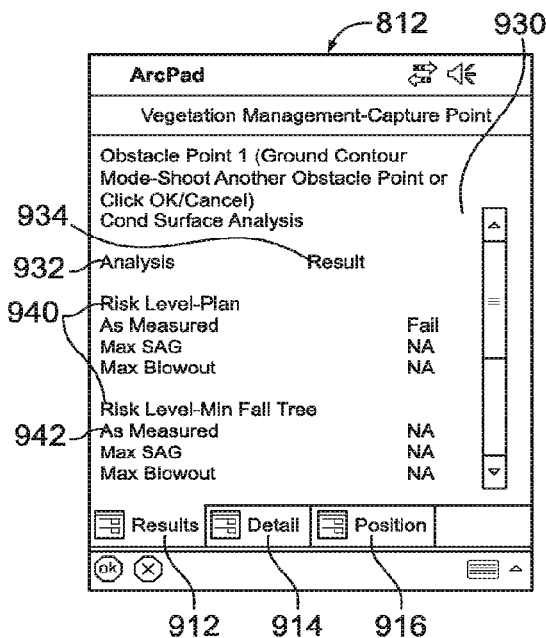
FIG. 9B is a view of the display of the handheld instrument of FIG. 8 showing grow-in/fall-in violation analysis of a vegetation object.

FIG. 9B is a view of the display 812 in FIG. 8 showing a result display 930 which includes the analysis of the captured vegetation point for conductor vegetation grow in analysis. In this example, the user has requested analysis relating to grow-in violations and has selected the detail tab 914. The display includes an analysis column 932 and a result column 934. The analysis column 932 includes the user defined clearance criteria risk levels which are shown in criteria fields 940. The criteria fields 940 in this example may include up to four risk levels such as planned criteria, minimum fall tree, action (not shown) and urgent (not shown). Each of the criteria field may have up to three user selected conductor operating conditions as shown in the conditions fields 942. In this example, the user has selected three different conditions expressed in the conditions fields 942, an as measured condition, a maximum sag condition and a maximum blow out condition. The results of the analysis for each of the respective criteria and conditions are shown in the result column 934. In this example, the vegetation object violates the clearance surface according to the plan criteria so the as measured condition under the risk level-plan field is indicated as a failure (a violation). The max sag field and the max blowout criteria under the as measured condition are indicated as NA as they are not applicable to this analysis. In this example, the analysis is not extended to the other risk levels, and thus these conditions are also indicated as NA.

Figure 9C:
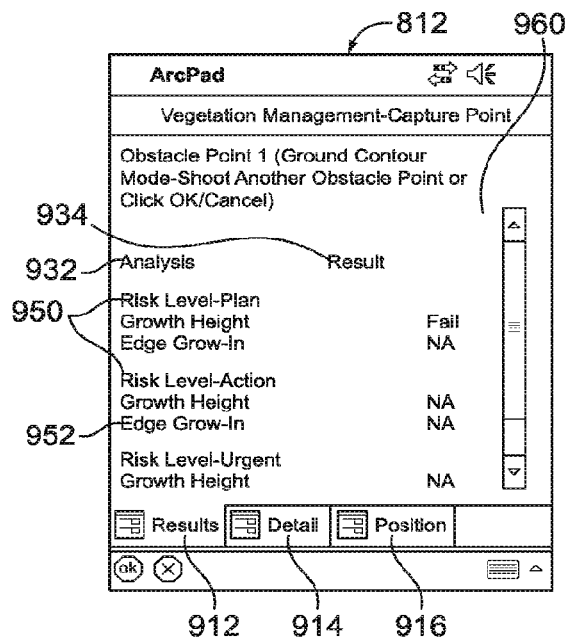
FIG. 9C is a view of the display of the handheld instrument of FIG. 8 showing the analysis of a vegetation object to determine allowable height and/or side growth.

FIG. 9C is a view of the display 812 in FIG. 8 showing a result display 960 which includes the analysis of the captured vegetation point for row vegetation edge growth and height encroachment analysis. In this example, the user has requested analysis relating to edge growth and height violations and has selected the detail tab 914. In this example, the user may select between three different criteria for encroachment analysis. The selected criteria are shown in criteria fields 950. In this example, the user has selected three risk levels or criteria, a planned criteria, an action criteria and an urgent criteria. Each of the criteria may have up to two user selected conditions shown in condition fields 952 under each criteria. In this example, the two conditions are growth height and edge (side growth) encroachment. In this example, the growth height for the vegetation object is violated according to the planned criteria and therefore a fail is indicated. The edge encroachment assessment is not applicable and therefore is assigned an NA designation in this example. The remaining conditions of the remaining risk criteria also are not applicable and are assigned an NA designation in this example.

Figure 9D:
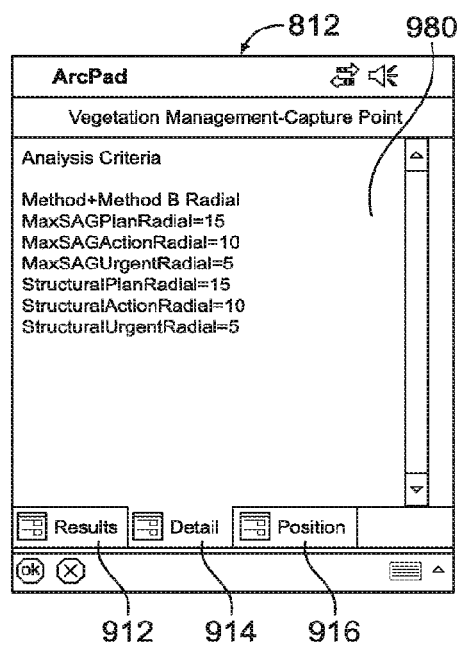
FIG. 9D is a view of the display of the handheld instrument of FIG. 8 showing the criteria used to generate the analysis of the object in FIG. 9B.

FIG. 9D is a view of the display 812 in FIG. 8 after the detail tab 954 is selected. FIG. 9C shows a detail screen 980 showing the criteria used to generate the analysis of the captured vegetation for purposes of the grow in analysis shown in FIG. 9B. The detail screen 980 indicates the criteria used for the analysis displayed in FIG. 9B. In this example, the method is specified as a radial. Each of the conditions for the risk levels is expressed in feet. Thus, the radial clearance criteria for the maximum sag allowed for the planned criteria is 15 feet, while the radial criteria for the maximum sag allowed for the action risk level is 10 feet and the radial criteria for the maximum sag allowed for the urgent risk level is 5 feet. In addition, the criteria is specified for measurements from the structures such as towers for the conductors. In this example, the radial criteria at the structure for the planned risk level is 15 feet, the radial criteria at the structure for the action risk level is 10 feet and the radial criteria at the structure for the urgent risk level is 5 feet. The clearance criteria at mid-span or maximum sag location may be assigned a different numeric value than at the structure to reflect an assessment of risk by a user.

After each shot of the laser range finder 806, the handheld computer 808 updates the internal storage to store the location and detailed status of the vegetation point location "shot" for each conductor operating condition analyzed. This internally stored data is available (in GIS format) for subsequent uploading to some other more permanent storage media upon completion of the field inspection activity in this example.

Upon encountering a vegetation violation, the user may "designate" the location of the violation to a "spotter" crew member via the laser pointer 810 who will then "flag" the violation to identify it for further clearing action.

In this example, the handheld computer 808 includes a data storage card that is a small media device for storing the definitions of the segmented clearance surfaces previously constructed, the previously segmented bare earth coordinate points, and the pertinent clearance analysis parameters for each of the multiple conductor operating conditions to be analyzed. This data is determined by the process described above with reference to FIGS. 1-9. The small physical size of the storage card as well as its limited data storage capacity illustrate the effectiveness and efficiency with which the clearance surface data modeling technique models the entire geometry of the right of way to be analyzed. Similarly, the memory capacity of the handheld computer 808 is limited and this procedure lends itself to geometric modeling efficiency and analysis capabilities. Of course, more memory and higher capability computers may be used for the above described processes.

In this example, one data storage card is capable of handling the entire data model for a 20 mile to 50 mile electric power transmission right of way. The data storage card can be used repeatedly for different rights-of-way by uploading the appropriate data model(s) to the card prior to carrying the handheld device 800 (with its card or cards) to the field. The data card in this example may also handle the entire data model for a 20 mile to 50 mile electric power transmission right of way when at least four different clearance criteria are used to create clearance surfaces for at least three conductor operating conditions.

Thus, the device 800 is capable of using the clearance surface data determined as described above to perform all the previously specified types of clearance analysis types in the field. Specifically, the device 800 is portable and lightweight and may be effectively operated by a forester. The use of the device 800 may effectively reduce the field inspection crew size that is typically used in the field for detecting, analyzing, identifying, and reporting vegetation violations using specific clearance criteria and therefore effectively increase the productivity of the field inspection crew. The device 800 may use and re-use the previously constructed clearance surface data models over and over again, well into the future, to perform new inspections of the corridor.

Figure 10A:
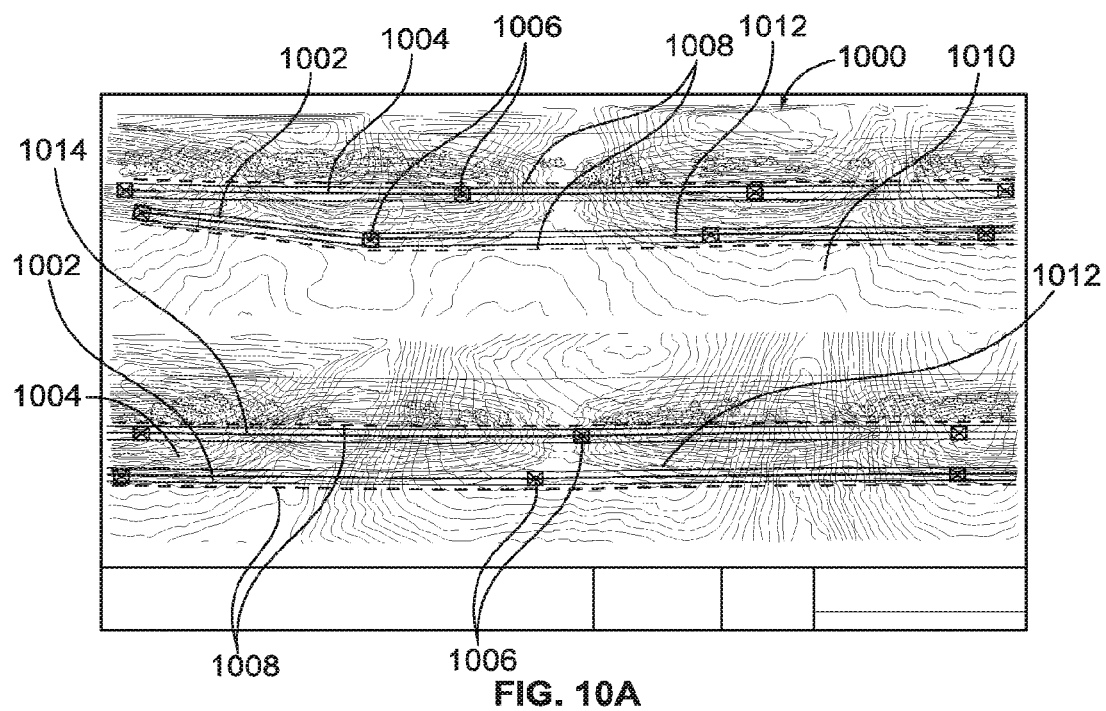
FIG. 10A is a scaled planimetric drawing of the results of a vegetation grow-in/fall-in analysis using the clearance surface method showing vegetation violations.

FIG. 10A is a scaled planimetric drawing 1000 of the results of a vegetation grow-in/fall-in analysis using the clearance surface method described above along with pertinent supporting information. The drawing 1000 is a two part map of a corridor/right of way 1002 that contains a number of conductors 1004 in the corridor/right of way. The drawing 1000 includes structure locations 1006 with identifying marks/names, right of way boundaries 1008, ground contours 1010 in elevation above sea level, and clearance surface contours 1012 expressed in height above ground level. The clearance surface may be effectively raised or lowered to effectively simulate vegetation growth in both vertical and horizontal dimensions.

The map 1000 includes the inventory of vegetation violation clusters 1014 inside and outside the right of way. The vegetation clusters 1014 are numbered to identify the particular span to which they "belong" and to define whether they exist inside or outside the right of way boundary. The vegetation clusters are bounded by a closed polygon to facilitate the calculation of the area included in the bounded polygon. Other attributes of the vegetation violation cluster may include perimeter, centroid location, apparent tree top locations and/or other relevant attributes.

Figure 10B:
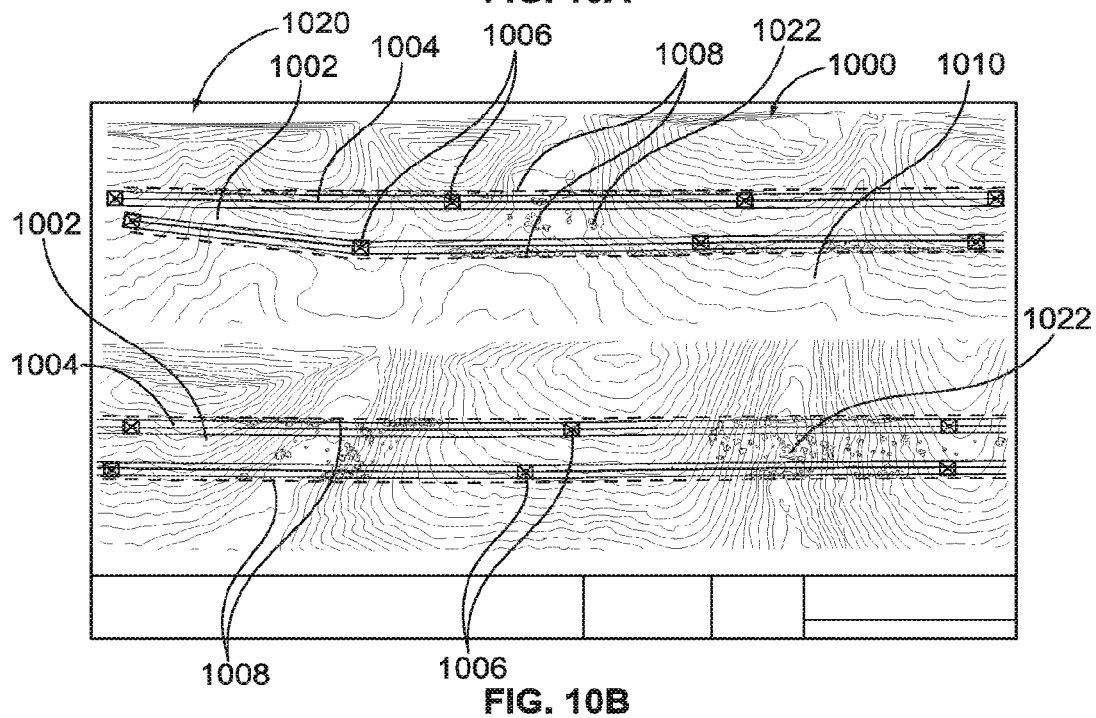
FIG. 10B is a scaled planimetric drawing of the results of a vegetation height/edge trimming analysis showing vegetation height violations.

FIG. 10B is a scaled planimetric drawing 1020 showing the results of a vegetation analysis that determines whether or not the vegetation inside the boundaries of the right of way/corridor exceeds an allowable height criteria and/or whether or not the vegetation along the sides of the boundaries of the right of way encroach (beyond an allowable horizontal distance criteria) into the right of way (e.g., the vegetation's lateral growth, above the allowable height criteria. Identical elements to FIG. 10A are labeled with like element numbers in FIG. 10B. FIG. 10B includes vegetations clusters 1020 that violate a height above ground clearance criteria or a side growth encroachment clearance criteria.

FIGS. 10A and 10B illustrates a report format that can be taken to the field in hardcopy form, and it illustrates a report format that may be used in electronic form to provide a base for mapping vegetation type/species and any other of a variety of useful information.

Figure 11:
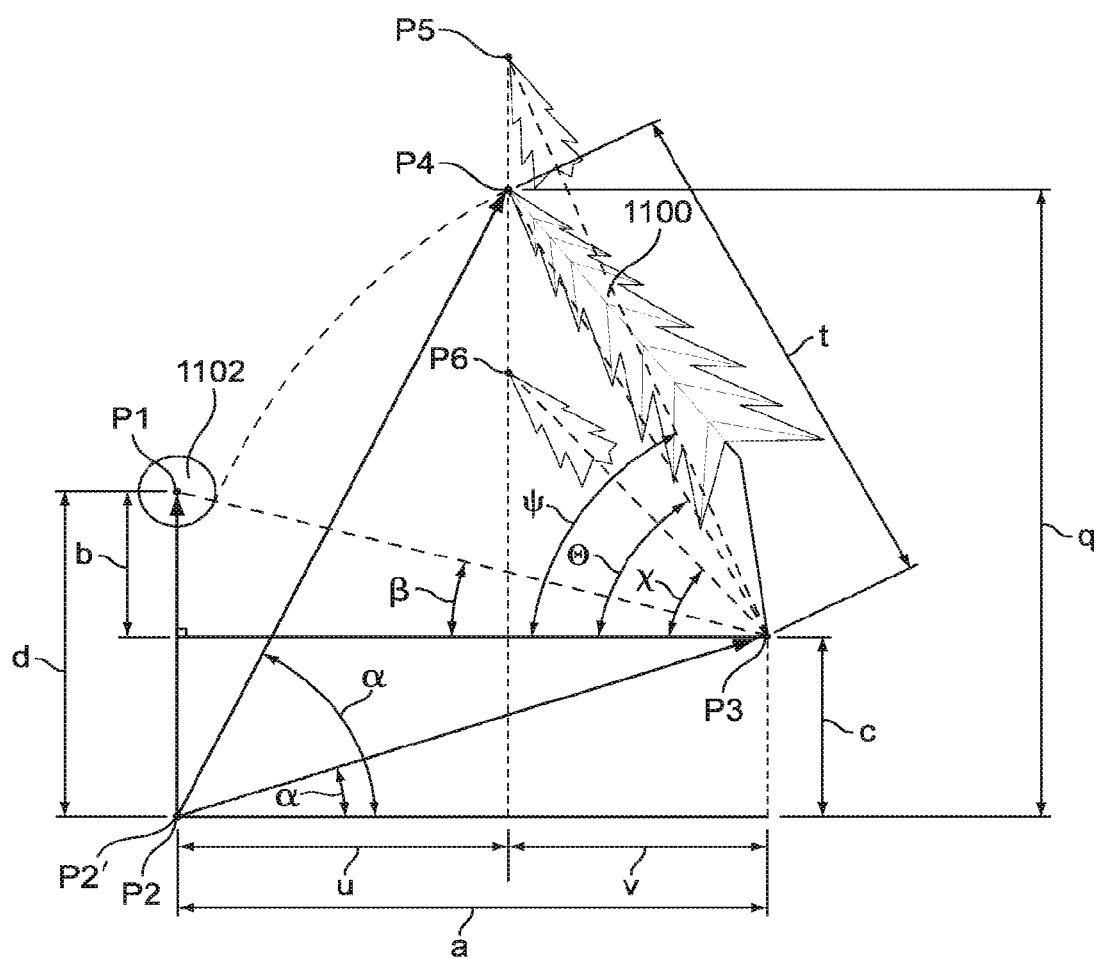
FIG. 11 is an illustration of the "leaning tree problem;"

FIG. 11 depicts the "leaning tree problem" Vegetation clearance analysis techniques applied to point coordinate data (LIDAR, or otherwise) may produce false positives (violation points that are not actually violations) due to the fact that any single/individual point coordinate cannot be accurately determined to be located on either a leaning tree or a vertically standing tree. A vertically standing tree is assumed with the absence of confirmation. The leaning tree may not be an actual violation due to its degree of lean. Currently, it is not possible to automatically detect and extract individual tree trunks from point cloud coordinate data. As will be described below, such trees may be identified via the handheld device 800 in FIG. 8.

Before a violation (hazard) tree is actually cut, a forester identifies the tree and physically tags or marks the as a violation/hazard tree to be cut by the cutting crew. Therefore, the determination of whether or not a given hazard tree is leaning is left to the forester observing the situation in the field. In this example, the software in the hand held device 800 includes an algorithm for determining whether or not a leaning tree actually does or does not pose a threat to the conductors (e.g., a clearance violation or hazard tree). If the tree is determined to be a "leaning tree" by a forester in the field, then the forester may use the hand held device 800 necessary to determine that the vegetation point in question is either a valid violation of the vegetation clearance criteria or a false-positive point to be discarded.

FIG. 11 shows a cross-section of a tree trunk 1100 and the various dimensions that are used by the mathematical technique performed in the handheld device 800 to determine whether a violation exists in relation to an electrical conductor 1102. In FIG. 11, point P4 has been determined (using the analysis method) to be in violation of the specified clearance criteria relative to point P1 which represents a point on the electrical conductor 1102. Therefore, the distance between point P4 and point P3 (the point on the ground about which the falling tree rotates when it falls) represents the tree's height which is sufficient to violate the radial clearance criteria (R) when the falling tree passes through the vertical angle beta (measured above the horizontal plane). For violation point P4, the vertical angle $\Theta$ (measured from the horizontal plane) represents the maximum allowable "lean angle." It is apparent that vegetation points (e.g., point P6 on the leaning tree 1100) directly below point P4 and having an apparent lean angle of chi above the horizontal would not have a tree height sufficient to cause point P6 to be a violation of the clearance criteria. However, it is also apparent that vegetation points (e.g., point P5 on the leaning tree) directly above point P4 and having a lean angle of $\Psi$ above the horizontal would have a tree height sufficient to cause point P5 to be a violation of the clearance criteria. Therefore, the determination of the apparent lean angle is both necessary and sufficient to determine whether or not the vegetation point at issue would or would not be in violation of the clearance criteria. Using the handheld device 800, a forester may determine the apparent lean angle of the leaning tree 1100 and thus determine if the vegetation point at issue is or is not in violation of the specified clearance criteria.

The forester's procedure for making this determination requires two shots of the laser range finder 806. The forester stands under the electrical conductor 1102 at a point closest to the apparent violating vegetation point P4 (tree top) while facing in a direction perpendicular to the conductor and using the laser range finder 806 located at point P2 to shoot the apparent violating vegetation point which is the top of the tree 1100 in this example. This determines via a preselected laser range finder function the horizontal distance (u) from the conductor and the laser range finder 806 to the top of tree (either point P4, P5, or P6) and the vertical distance (Q) from the laser range finder 806 at point P2 and the top of the tree (either point P4, P5, or P6).

The forester then relocates (if necessary) and stands under the electrical conductor 1102 at a point closest to the base of the leaning tree (point P3) while facing in a direction perpendicular to the conductor and using the laser range finder 806 now located at point P2' to shoot the base of the leaning tree (point P3), thus determining via the preselected laser range finder function the horizontal distance from the conductor to the base of the leaning tree (point P3) and the vertical distance (c) from the laser range finder 806 at point P2' and the base of the leaning tree (point P3). In this example, the base and the top of the tree 1100 (points P3 and P4) are in the same plane that perpendicular to the vertical plane and therefore points P2 and P2' are in the same location. If the tree 1100 were leaning at an angle such that the base (point P3) was either proximal or distal to the viewer of FIG. 11 relative to the top at point P4, the forester would have to relocate toward or away from point P2 to shoot the base of the learning tree 1100.

The algorithm will make a determination based on the data whether the tree 1100 is a violation and will display whether the vegetation point (P4) is or is not a violation of the clearance criteria on the display screen 812. The algorithm determined if the apparent leaning tree height (T) is greater than the difference (a−R). That is, conservatively, a violation occurs if $[T \Rightarrow (a-R)]$, where R=Radial Clearance Criteria, $L=SQRT((a*a)+(c*c))$, {SQRT is the Square Root function}, $S=SQRT((u*u)+(Q*Q))$, and $T=SQRT((S*S)-(L*L))$.

Additionally, if $[T \Rightarrow (a-R)]$, a useful maximum allowable apparent lean angle ($\Theta$) is determined (and displayed) by determining $v=a-u$ and $\Theta=A\,COS(v/T)$, where A COS is the arc-cosine function and any vegetation points located directly above point P4 (e.g., $\Psi > \Theta$) are to be designated as violations of the radial clearance criteria while any vegetation points located directly below point P5 (e.g., $\chi < \Theta$) are to be designated as non-violations of the radial clearance criteria.

Figure 13:
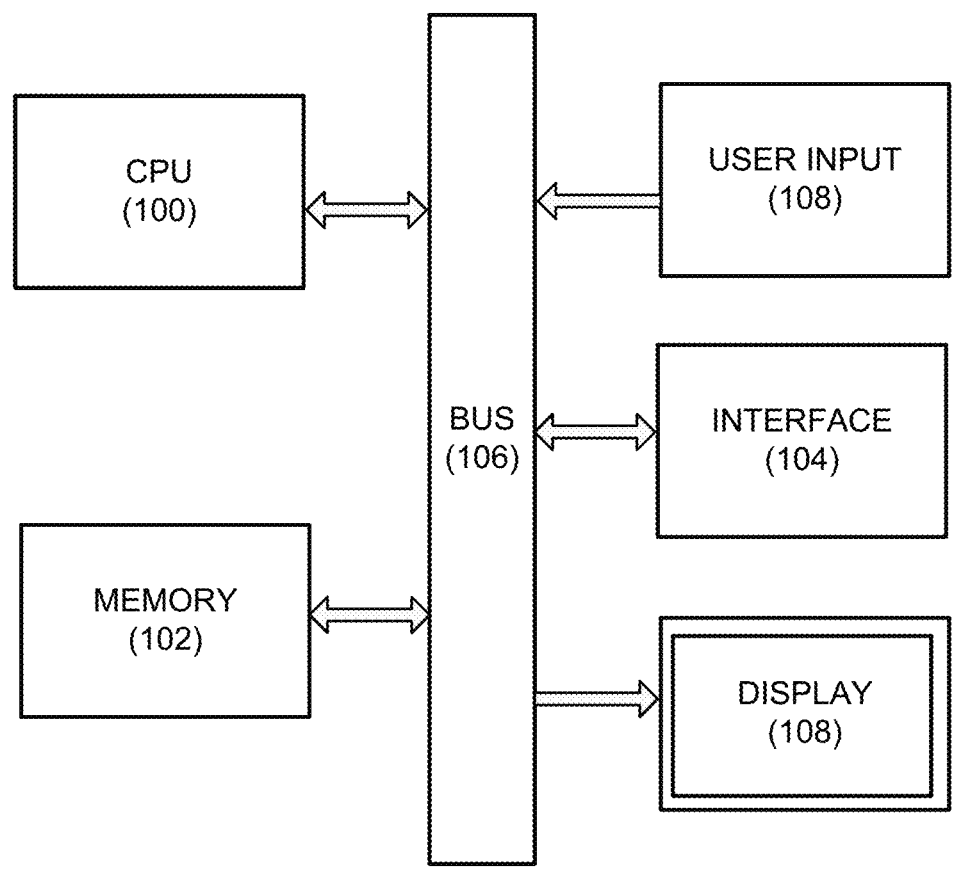
FIG. 13 is a block diagram of the components of the handheld instrument in FIG. 8

As shown in FIG. 13, the computer to determine the clearance data and the computer 808 may include a central processing unit (CPU), controller or processor 100, a memory 102, and an interface system 104 which are coupled together by a bus 106 or other link, although other numbers and types of each of the components and other configurations and locations for the components can be used. The processors in the computers described herein may execute a program of stored instructions for one or more aspects of the methods and systems as described herein, including for determining regions of clearance violations, although the processor could execute other types of programmed instructions. The memory may store these programmed instructions for one or more aspects of the methods and systems as described herein, including the method for determining regions of clearance violations, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device 108 may comprise a computer keyboard and a computer mouse, although other types and numbers of user input devices may be used. A display 110 may comprise a computer display screen, such as a CRT or LCD screen by way of example only, although other types and numbers of displays could be used.

Although an example of the computers are described and illustrated herein in connection with FIGS. 1-7, each of the computers could be implemented on any suitable computer system or computing device. It is to be understood that the example devices and systems are for exemplary purposes, as many variations of the specific hardware and software used to implement the methods described herein, as will be appreciated by those skilled in the relevant art(s).

Furthermore, each of the devices described herein may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the computers described herein. Accordingly, principles and advantages of distributed processing, such as redundancy, replication, and the like, also can be implemented, as desired, to increase the robustness and performance of computers described herein. The computers may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 12:
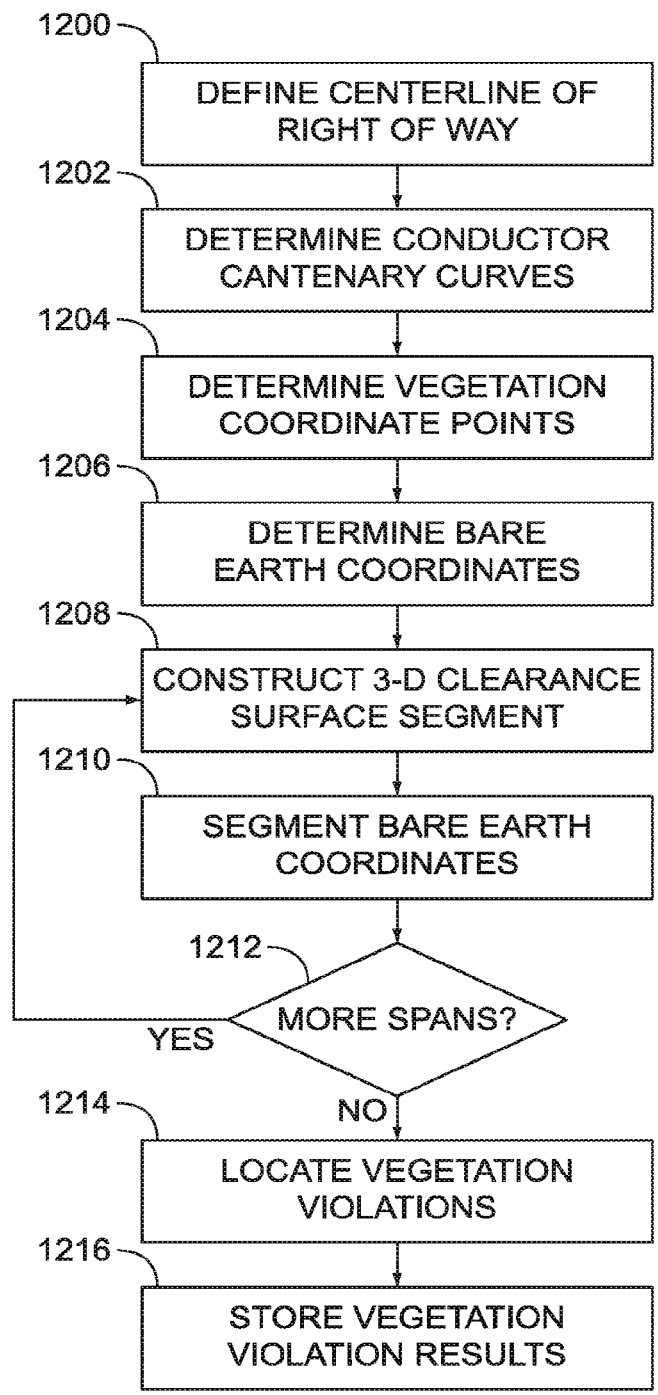
FIG. 12 is a flow diagram of the process to determine clearance violations.

The operation of the example determination of clearance surfaces and whether objects violate the clearances, will now be described with reference to FIGS. 1-7 in conjunction with the flow diagrams shown in FIG. 12. The flow diagram in FIG. 12 is representative of example machine readable instructions for implementing determination of clearance surfaces and whether objects violate the clearances. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the determination of clearance surfaces and whether objects violate the clearances could be implemented by software, hardware, and/or firmware. Also, some or all of the machine readable instructions represented by the flowchart of FIG. 12 may be implemented manually. Further, although the example algorithm is described with reference to the flowchart illustrated in FIG. 12, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In FIG. 12, the centerline of the right of way is defined (1200). In this example, the right of way includes various structures such as electrical towers which define spans between the towers. Thus, catenary curves of the conductors between the towers are determined (1202). Vegetation coordinate points are determined from the cloud of image data from a scene (1204). The bare earth coordinates are then determined from the cloud of image data from the scene (1206).

A first 3-D clearance surface segment is constructed between a first span using the determined right of way, catenary curve and the bare earth coordinates (1208). The bare earth coordinates are then segmented for the span (1210). The process then determines whether there are additional spans (1212). If there are remaining spans, the process then loops back to 1208 to construct the next clearance surface segment.

After all of the surface segments are constructed (1212), the vegetation points are classified as a violation of the clearance curves or not by locating the vegetation that violates the clearance curves (1214). The violations results and classification analysis is then stored (1216).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A portable device for recording obstruction data from a geographical area, the device comprising:
    a memory device storing data of objects in the geographical area including a previously recorded obstruction, clearance surface data and contour map data;
    a controller coupled to the memory device to generate display data;
    a display displaying a contour map of the area including the objects in the area based on the display data; and
    an input device accepting inputs from a user to record an observed location of the obstruction in the area.

2. The portable device of claim 1, further comprising a laser range finder coupled to the input device, the laser range finder determining the location of the obstruction via a single laser shot at the obstruction.

3. The portable device of claim 1, wherein the portable device is a handheld device.

4. The portable device of claim 1, wherein the controller determines whether the recorded obstruction location violates clearance criteria for the area.

5. The portable device of claim 1, further comprising a positioning device to display the position of the portable device on the contour map.

6. The portable device of claim 1, wherein the display displays a map background having one of a group of aerial photographs, digital terrain models, and diagrams.

7. The portable device of claim 1, wherein the memory device is a storage card having the data preloaded.

8. The portable device of claim 1, wherein the controller performs multiple types of analysis based on the obstruction data.

9. The portable device of claim 1 further comprising a camera for capturing an image of the area.

10. The portable device of claim 1, further comprising a telecommunication device for transmitting the recorded location of the obstruction.

11. A method of recording obstruction data from a geographical area, the method comprising:
    storing data of objects in the geographical area including a previously recorded obstruction, clearance surface data and contour map data on a storage device;
    displaying a contour map of the area including the objects in the area on a display device via a controller; and
    accepting an input from a user to record an observed location of the obstruction in the area via an input device.

12. The method of claim 11, wherein the observed location is determined via a single laser shot from a laser range finder coupled to the input device.

13. The method of claim 11, wherein the display, controller and input device are in a portable handheld device.

14. The method of claim 11, further comprising determining whether the recorded obstruction location violates clearance criteria for the area.

15. The method of claim 13, further comprising displaying the position of the portable device on the contour map.

16. The method of claim 11, further comprising displaying a map background including one of aerial photographs, digital terrain models, and diagrams.

17. The method of claim 11, further comprising capturing an image of the area via a camera.

18. The method of claim 11, further comprising transmitting the recorded location of the obstruction.

* * * * *